(12) United States Patent
Goyal

(10) Patent No.: US 9,130,779 B2
(45) Date of Patent: Sep. 8, 2015

(54) METHOD AND APPARATUS FOR PROVIDING ENHANCED SMS/EMS/MMS

(75) Inventor: Amitabh Goyal, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 12/476,430

(22) Filed: Jun. 2, 2009

(65) Prior Publication Data

US 2010/0304766 A1     Dec. 2, 2010

(51) Int. Cl.
*H04W 4/14* (2009.01)
*H04L 12/58* (2006.01)

(52) U.S. Cl.
CPC ............ *H04L 12/5885* (2013.01); *H04L 51/34* (2013.01); *H04L 12/585* (2013.01); *H04L 12/5895* (2013.01)

(58) Field of Classification Search
CPC .................................. H04W 4/14; H04W 4/12
USPC .................. 370/315, 328, 349; 709/206–207; 455/466
See application file for complete search history.

(56) References Cited

U.S. PATENT DOCUMENTS

| | | | |
|---|---|---|---|
| 8,005,067 B2 | 8/2011 | Varma | |
| 2001/0021649 A1* | 9/2001 | Kinnunen et al. | 455/412 |
| 2005/0108621 A1* | 5/2005 | Kim et al. | 715/500 |
| 2005/0232267 A1* | 10/2005 | Mostafa | 370/389 |
| 2006/0056342 A1* | 3/2006 | Lee | 370/328 |
| 2006/0270389 A1* | 11/2006 | Maes | 455/414.1 |
| 2007/0011244 A1* | 1/2007 | O'Neal et al. | 709/206 |
| 2007/0088801 A1* | 4/2007 | Levkovitz et al. | 709/217 |
| 2007/0192476 A1* | 8/2007 | Watanabe et al. | 709/223 |
| 2007/0226367 A1* | 9/2007 | Cai et al. | 709/238 |
| 2007/0232334 A1* | 10/2007 | Nagashima et al. | 455/466 |
| 2008/0096538 A1* | 4/2008 | Kim et al. | 455/418 |

(Continued)

FOREIGN PATENT DOCUMENTS

| | | |
|---|---|---|
| CN | 101106742 A | 1/2008 |
| CN | 101166312 A | 4/2008 |

(Continued)

OTHER PUBLICATIONS

International Search Report—PCT/US2010/037107—International Search Authority, European Patent Office, Nov. 25, 2010.

(Continued)

*Primary Examiner* — Wayne Cai
*Assistant Examiner* — Michael Irace
(74) *Attorney, Agent, or Firm* — Shirin Tefagh

(57) ABSTRACT

A system and various methods provide enhanced SMS/MMS/EMS messaging services. In an embodiment, a delivery confirmation of a SMS/MMS/EMS message is provided to the originating sender's communication device. In another embodiment, a read receipt of a SMS/MMS/EMS message is provided to the originating sender's communication device. In other embodiments, a sender is provided with the ability to delete a previously sent and received SMS/MMS/EMS message from a recipient's communication device or recall/replace a previously sent and received SMS/MMS/EMS message with a new SMS/MMS/EMS message. In another embodiment, a sender is provided with the ability to send a SMS/MMS/EMS message that will automatically be deleted upon the occurrence of an expiration event. In other embodiments, a recipient may block, re-route or restrict the use of SMS/MMS/EMS message.

4 Claims, 26 Drawing Sheets

(56) References Cited

U.S. PATENT DOCUMENTS

| | | | |
|---|---|---|---|
| 2008/0146259 A1* | 6/2008 | Chin et al. | 455/466 |
| 2008/0182556 A1 | 7/2008 | Kozam | |
| 2008/0182566 A1 | 7/2008 | Camp, Jr. | |
| 2008/0207235 A1 | 8/2008 | Choi | |
| 2008/0246605 A1* | 10/2008 | Pfeffer et al. | 340/540 |
| 2009/0047929 A1* | 2/2009 | Chesnutt et al. | 455/411 |
| 2009/0214034 A1* | 8/2009 | Mehrotra et al. | 380/255 |
| 2010/0159889 A1* | 6/2010 | Sigmund et al. | 455/413 |
| 2010/0233995 A1* | 9/2010 | Gopalaswamy et al. | 455/410 |

FOREIGN PATENT DOCUMENTS

| | | |
|---|---|---|
| CN | 101369896 A | 2/2009 |
| JP | 2002099489 A | 4/2002 |
| JP | 2004240813 A | 8/2004 |
| JP | 2004526352 A | 8/2004 |
| JP | 2004295552 A | 10/2004 |
| JP | 2008085444 A | 4/2008 |
| JP | 2009503674 A | 1/2009 |
| KR | 20040043489 A | 5/2004 |
| KR | 20060001119 A | 1/2006 |
| KR | 100633698 B1 | 10/2006 |
| KR | 100637327 B1 | 10/2006 |
| KR | 100724429 81 | 5/2007 |
| KR | 20070075462 A | 7/2007 |
| WO | WO-2007123621 A1 | 11/2007 |
| WO | WO2008147136 | 12/2008 |

OTHER PUBLICATIONS

Written Opinion—PCT/US2010/037107—ISA/EPO—Nov. 25, 2010.

* cited by examiner

| Sender ID | Re-routing ID |
|---|---|
| 202-555-1212 | 303-999-1111 |
| 202-555-1313 | 303-999-1111 |
| 202-555-1414 | 303-999-3333 |
| 202-555-1515 | 303-999-5555 |

FIG. 20

| Restricted Location | Restricted Time |
|---|---|
| School | Mon-Fri 8 am to 4 pm |
| Work | |
| House of Worship | Fri, Sat, Sun |
| | 12 pm - 1 pm |

FIG. 24

METHOD AND APPARATUS FOR PROVIDING ENHANCED SMS/EMS/MMS

FIELD OF THE INVENTION

The present invention relates generally to wireless digital messaging communication such as SMS, EMS, and MMS and more specifically to providing enhanced service features for SMS, MMS and EMS.

BACKGROUND

Short Message Service (SMS) is a standardized communication service typically used in mobile communication systems but may also be used in non-mobile communication devices. Using standardized communications protocols, SMS allows for the interchange of short text messages between communication devices. SMS text messaging has become the most widely used data application on the planet, with 2.4 billion active users, or 74% of all mobile phone subscribers sending and receiving text messages on their communication devices.

While remaining largely unchanged since its introduction, SMS has had some enhancements introduced to its basic service. For example, Enhanced Message Service (EMS) enabled mobile phone can send and receive messages containing special text formatting (such as bold or italic), animations, pictures, icons, sound effects and special ring tones. Messages that are originated as an EMS message may be sent to a communication device that does not support EMS. In such cases the EMS message will be displayed as a conventional SMS message. However, the message may be unreadable due to the presence of additional data that cannot be rendered by the device. Typically, EMS messages cannot be exchanged between communication devices belonging to subscribers of different service provider, as the EMS messages will frequently be dropped by the inter-carrier network or by the receiving carrier.

As another example of some of the enhancements introduced to basic SMS service, Multimedia Messaging Service (MMS) is a telecommunications standard for sending SMS messages which include multimedia objects (images, audio, video, rich text). MMS is an extension of the SMS standard, allowing for longer message lengths. In addition, MMS may utilize Wireless Application Protocols (WAP) to display the content. MMS' most popular use is found in the sending of photographs from camera-equipped handsets, although it is also popular as a method of delivering ringtones as well.

SMS, EMS and MMS messages may be sent from one user (a sender) to another (a recipient) as a point to point communication (SMS-PP) or from one user (sender) to many other users (recipients) as a broadcast message (SMS-CB). Messages addressed to a recipient are sent by the sender to a Short Message Service Center (SMSC). The SMSC provides a store-and-forward mechanism. After receiving the message, the SMSC stores the message until the recipient's communication device alerts the SMSC that the recipient's communication device has registered with a communication network. Once the SMSC has received the alert, the SMSC will forward the message to the recipient's communication device and thereby remove the message from the SMSC's local memory. If a recipient's communication device is not reachable (e.g., turned off, out of range), the SMSC queues the message for later retry of delivery. Some SMSCs also provide a forward-and-forget delivery mechanism where transmission is tried only once.

Both store-and-forward and forward-and-forget delivery mechanisms are considered a "best efforts" type delivery mechanism. Neither delivery mechanism guarantees that a message will actually be delivered to its intended recipient and delay or complete loss of a message is not uncommon, particularly when sending between networks.

SUMMARY

Disclosed are systems, devices and methods for providing enhanced wireless digital communication message (i.e., SMS, EMS or MMS) services. Various embodiments are disclosed which allow senders as well as recipients of wireless digital communication messages to manipulate or control the handling, storage, and delivery of the messages. In one embodiment, a sender may be provided with a delivery acknowledgment of the message. In another embodiment, a sender may send a message with a request to the recipient to provide the sender confirmation that the message was read. In another embodiment, a sender may be provided with a method to delete a previously sent message from either a SMSC memory or from a recipient's communication device. In another embodiment, the sender may be provided with a method to replace a previously sent message in either a SMSC memory or in a recipient's communication device with a new message. In another embodiment, a sender may be provided with a method to send a message that will automatically delete itself from memory after it has been read or upon the occurrence of an expiration event. In another embodiment, recipients may be able to configure their communication devices to delete a received message upon the occurrence of expiration event. In another embodiment, a recipient may be able to prevent select senders from sending messages to the recipient's communication device. In another embodiment, a recipient may be provided with a method to re-route received messages from select senders to a different recipient's communication device. In another embodiment, a sender may prevent a recipient of the sender's message from forwarding the message to any other device. In another embodiment, a sender may send a recipient a message that can only be read in specific locations.

According to other embodiments, communication systems and communication system components are configured to perform one or more of the foregoing methods.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

FIG. 20 is an exemplary re-routing list used to re-route SMS messages sent from select senders' communication devices to a re-routed recipient's communication device.

FIG. 24 is an exemplary table of restricted locations and/or times that may be stored in memory by a recipient's communication device and/or the SMSC.

DETAILED DESCRIPTION

Figure 1:
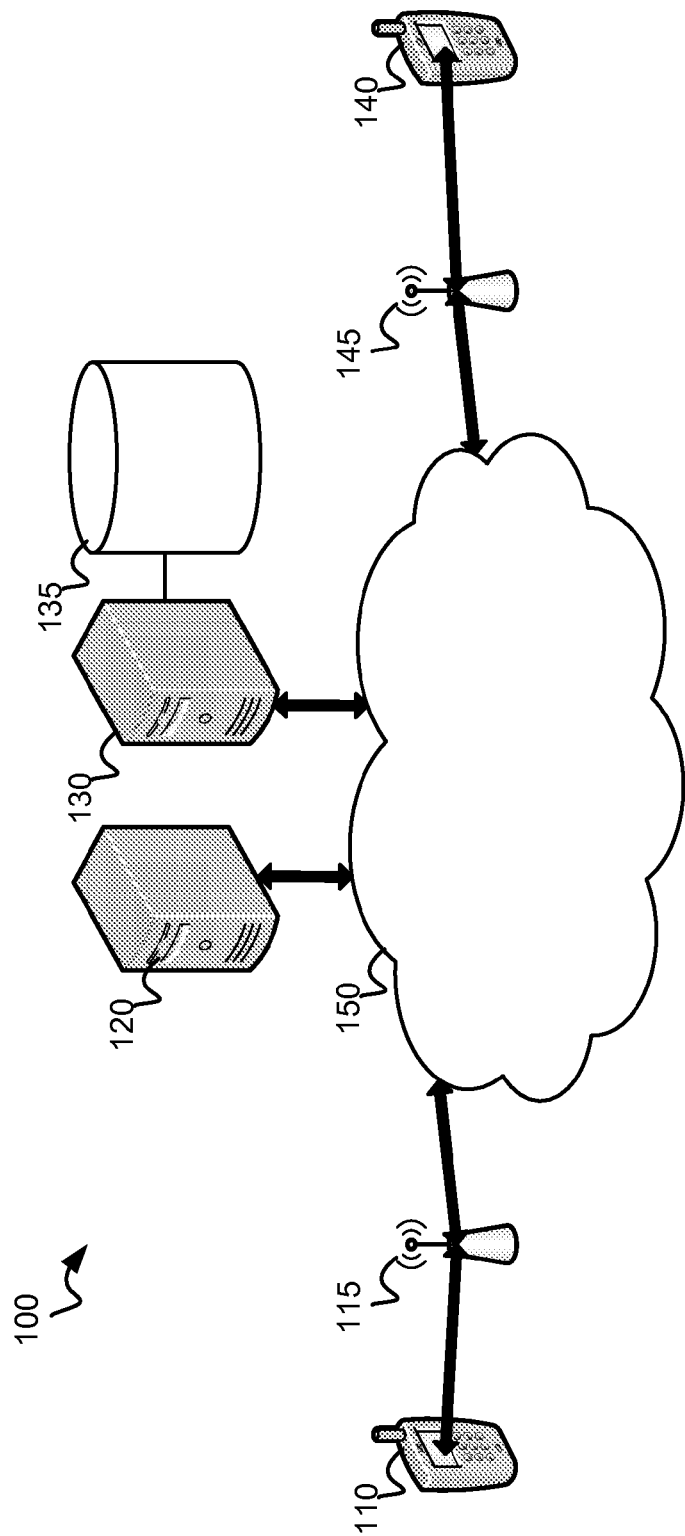
FIG. 1 is system block diagram of an example communication network system which allows users to send and receive wireless digital communication messages through their communication devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "communication device" and "mobile station" may refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the Blackberry Storm®), and similar personal electronic devices which include a programmable processor and memory that have SMS, EMS, and/or MMS capabilities. In a preferred embodiment, the communication device is a cellular handset that can communicate via a cellular telephone network (e.g., a cell phone) and is capable of sending and receiving SMS messages. However, the various embodiments are not intended to be limited to such communication devices and cellular telephone systems. Indeed the various embodiments may be implemented using any type of communication device including desktop computers that has SMS, EMS, and/or MMS capabilities.

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet, an instant messaging network, a simple messaging system network and/or a cellular telephone network.

Disclosed are systems and methods for providing enhanced wireless digital communication message service. Wireless digital communication messaging may include any of SMS, EMS, or MMS messages. For sake of simplicity, the SMS, EMS and MMS messages are referred to collectively as SMS messages. The various embodiments disclosed herein may be described as sending and receiving SMS messages. However, one of skill in the art would appreciate that each of the embodiments disclosed herein may be applied to the sending and receiving of EMS or MMS messages as well.

SMS usage is ever increasing despite the relatively primitive control over the sending, receipt, handling and storage of messages. One of the reasons for SMS's popularity over more advanced messaging systems is the relative simplicity of communication network infrastructure that is needed to support SMS. Regions with developing communication network infrastructures may not be able to support more advanced forms of messaging protocols. In a conventional SMS system, once a sender transmits a SMS message to the SMSC the sender relinquishes dominion and control over that message. The sender may not recall, replace, delete or manipulate the message in any way. This may be problematic for the sender. Particularly when the message was inadvertently sent to the wrong recipient, or contains errors or inappropriate material in the message payload. These problems may be exacerbated when the recipient keeps the mistaken message stored on the recipient's communication device or forwards the mistaken message on to other recipient communication devices.

Likewise, recipients have little control over the SMS messages that are received by their communication devices. For example, as the popularity of SMS has increased, SMS has become an alternative communication channel for marketing efforts. Recipients who have little to no interest in these types of messages often have little recourse other than to delete the messages from their communication devices once they have been received. In other instances, recipients may wish to block or re-route SMS messages sent to a particular communication device. For example, some parents may provide their children with a mobile phone for use in emergency situations. In order to prevent excessive SMS usage, parents may wish to block SMS messages to their child's mobile phone. In other instances, the parents may wish to re-route any SMS message directed to their child's mobile phone to their own. In this way, parents may be able to monitor their children's mobile phone usage. Enhancements to SMS messaging are disclosed herein to alleviate some of these and other problems with conventional SMS messaging.

FIG. 1 is system block diagram of an example communication network system 100 capable of supporting the various embodiment methods disclosed herein. The communication system shown in FIG. 1 includes a sender's communication device 110 and a recipient's communication device 140. As shown in FIG. 1, both the sender's communication device 110 and the recipient's communication device 140 are depicted as wireless communication devices. However, one of skill in the art would appreciate that any communication device capable of sending and receiving SMS messages may be implemented to perform the various embodiments disclosed herein. In addition, both the sender and recipient communication devices 110 and 140 are depicted in FIG. 1 to be subscribers of the same service provider's communication network 150. One of skill in the art would appreciate that the sender and recipient may subscribe to different service provider communication networks. In such a case, the sender's service provider network including short message service center (SMSC) 120 may contact a home location registry (HLR) 130 belonging to the recipient's different service provider communication network to obtain the necessary send routing information (SRI) as described in more detail below.

When a sender attempts to send an SMS message, the sender inputs a unique identifier assigned to the intended recipient's communication device as well as a short text message payload. The unique identifier assigned to the intended recipient's communication device may typically be the recipient's phone number but may be any other unique identifier. The short text message payload is typically limited to 160 characters 7-bit characters (140 8-bit characters, or 70 16-bit characters (including spaces)) and may be encoded using a variety of alphabets.

When the subscriber executes a send command for the inputted SMS message, the sender's communication device 110 transmits the SMS message over its air interface to a base station 115 that is operating within the subscribed to service provider communication network 150. The base station 115 relays the SMS message to a short message service center (SMSC) 120 supporting SMS communications for the subscribed to service provider network. In order to relay the message to the SMSC, the base station 115 may be coupled to a base station controller (BSC) (not shown) which in turn may be coupled to a packet data serving node (PSDN). Communication to the SMSC 120 may be conducted through the PSDN network operating as part of the overall communication network 150. Typically, the network address of the SMSC 120 is provided to the sender's communication device 110 as part of the provisioning data that is used to enable communications over the subscribed to service provider communication network 150. The SMSC 120 receives the SMS message and stores it in a local memory. Using the inputted recipient address information contained within the SMS message itself, the SMSC 120 interrogates a home location registry (HLR) 130 to obtain send routing information (SRI) for the recipient's communication device 140. When a wireless communication device registers with a communication network it establishes a communication link with one of the communication network's base stations. The identity of the communication device and the base station to which it is currently linked may be stored in the HLR 130 or a HLR database 135 connected to the HLR. By interrogating the HLR 130 for this information, an end-to-end communication link may be established between the SMSC 120 and the recipient's communication device 140. Once the SRI is obtained by the SMSC 120, the SMSC 120 may forward the SMS message via the communication network 150 and base station 145 to the recipient's communication device 140.

If the recipient's communication device 140 is turned off or out of range of any of its communication network's base stations then there may not be an entry in the HLR 130 for the recipient's communication device. In such cases, the SMSC 120 continues to store the SMS message until it receives an alert that the recipient's communication device 140 has registered its location with the HLR 130 (i.e., turned on or come back into range with one of the base stations). Once the recipient's communication device 140 has registered with its communication network, the SMSC 120 may forward the SMS message to the recipient's communication device 140 in the manner described above. This telecommunication technique where the message is sent to an intermediate station (SMSC 120) where it is kept and sent at a later time to the final destination (recipient's communication device) is often referred to as store and forward technology.

Since the SMS messages may be received by an intermediate SMSC 120 before being forwarded to the recipient's communication device, processing and manipulation of SMS messages may be performed by the SMSC 120 as well as by the recipient's communication devices 110 and 140. Processing and manipulations of SMS messages may be initiated by commands generated by either the sender's communication device 110 or the recipient's communication device 140.

In a conventional SMS communication system the sender sends the SMS message under the assumption that the message will be accurately delivered and promptly read. However, store-and-forward technologies provide no guarantees that the message will be accurately delivered let alone promptly read. Moreover, even assuming accurate delivery, since messages are stored and forwarded from the SMSC 120 and not actually delivered until the recipient communication device 140 registers itself with a communication network, delivery of the message may be significantly delayed. In conventional SMS communication systems the actual sender of the SMS message is never informed of the successful delivery of the SMS message to the recipient's communication device 140. Furthermore, while the SMS message may be delivered to the recipient's communication device 140, nothing is done to verify that the recipient actually reads the message once delivered.

Figure 2:
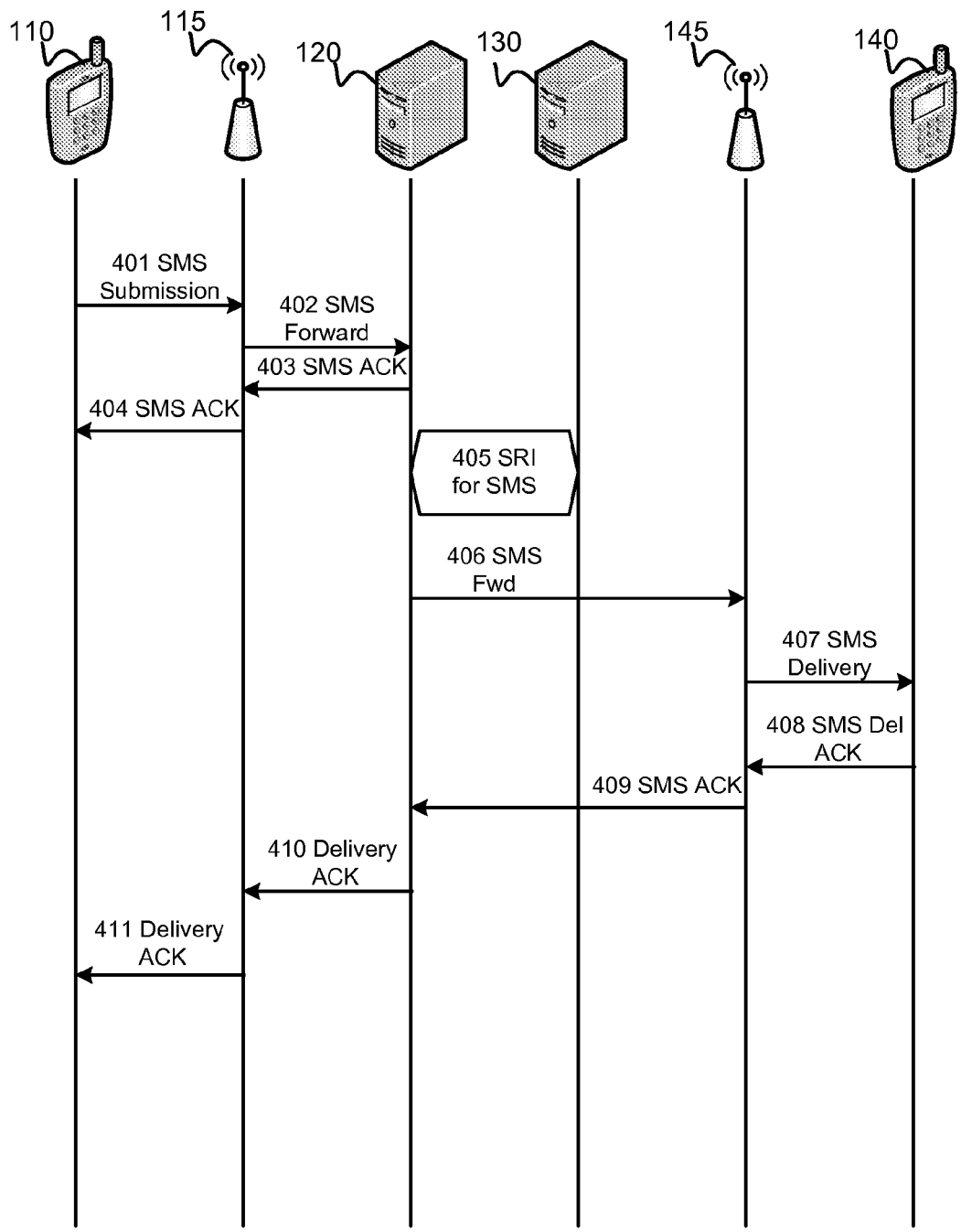
FIG. 2 is a message flow diagram illustrating the various messages that may be sent in an embodiment method for providing a message delivery confirmation to an originating sender's communication device in a SMS communication system.

An embodiment provides an enhanced SMS service by providing the originating sender of the SMS message with a delivery confirmation when the SMS message is received by the recipient's communication device. FIG. 2 is a message flow diagram illustrating the flow of messages between various components of the SMS communication system 100 to provide the originating sender with such a delivery confirmation message. When a sender sends a SMS message, the SMS message is transmitted from the sender's communication device 110 via the air-interface to a base station 115 operating within the sender's subscribed to communication network 150, message 401. The base station 115 relays the SMS message to a SMSC 120, message 402. When the SMSC 120 receives the SMS message a SMS acknowledgment message is typically sent to the sender's communication device via the base station 115, messages 403 and 404. However, since actual delivery of the SMS message to the intended recipient has not occurred, the acknowledgment message is not sufficient to inform the sender that the SMS message has been accurately delivered to the intended recipient. As discussed above, the SMSC 120 may interrogate a HLR 130 to obtain SRI for the recipient's communication device 140, message 405. Using the retrieved SRI, the SMSC 120 forwards the SMS message to the base station 145 to which the recipient's communication device 140 has established a communication link, message 406. The base stations 145 relays the SMS message to the recipient's communication device 140, message 407.

In an embodiment, once the SMS message is successfully delivered to the recipient's communication device 140, the device 140 generates a SMS delivery acknowledgment confirming receipt of the SMS message. The SMS delivery acknowledgement may be transmitted to the base station 145, message 408, for relay to the SMSC 120, message 409. Once the SMS delivery acknowledgement is received by the SMSC 120, a delivery confirmation message may be generated by the SMSC 120 to send to the base station 115, message 410, for relay onto the sender's communication device 110, message 411. The delivery confirmation message generated by the SMSC 120 may include information regarding the date/time that the original SMS message was generated and sent by the sender's communication device 110 to the SMSC 120 as well as the address (phone number) of the recipient that received the SMS message. In this manner, a sender may receive confirmation that the sent SMS message was successfully delivered to the intended recipient communication device 140. In an embodiment, a subject line, message identifier or portion of the transmitted message may be included within the delivery confirmation message so that the sender can know the particular message whose delivery is being confirmed.

Figure 3:
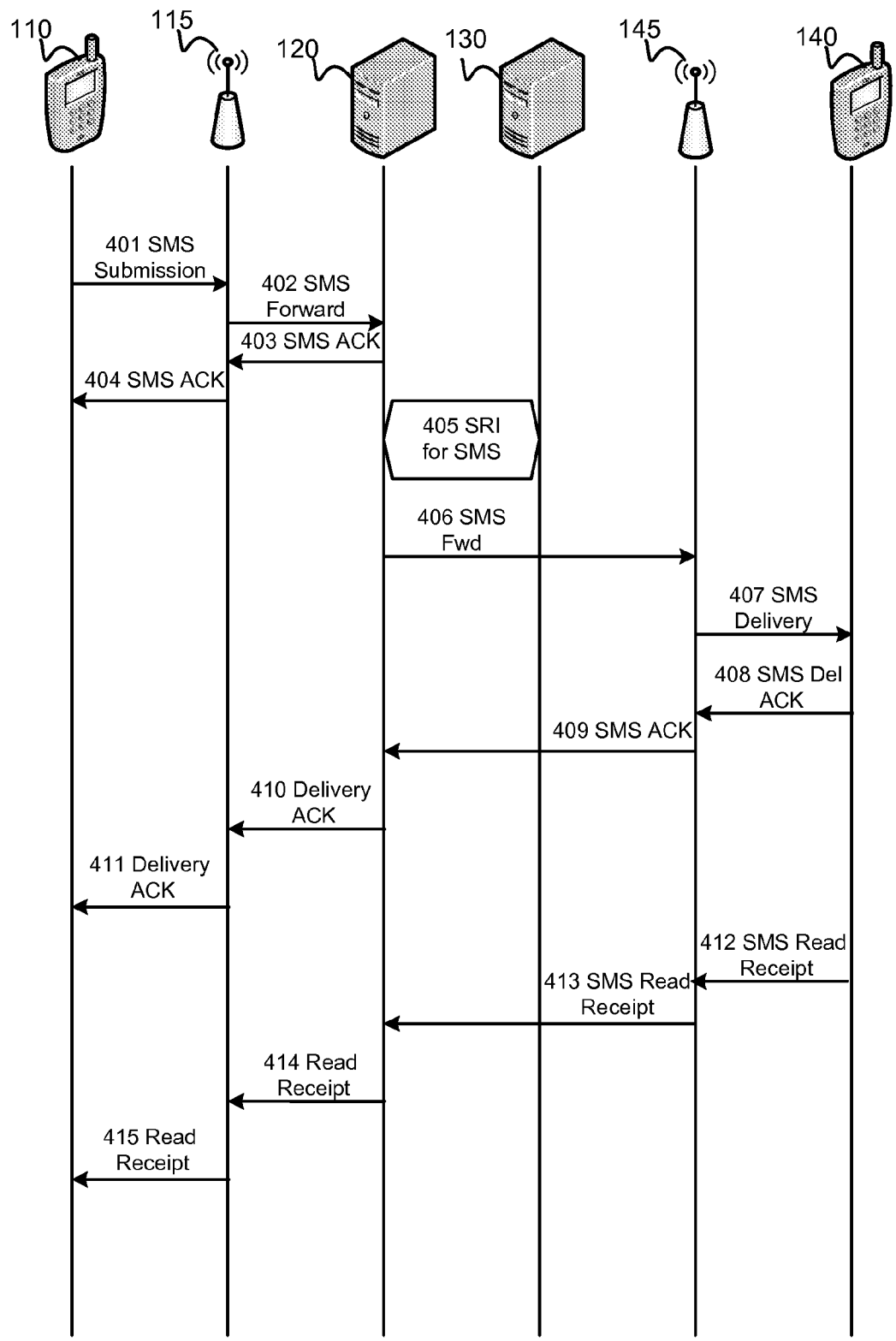
FIG. 3 is a message flow diagram illustrating the various messages that may be sent in an embodiment method for providing a read receipt confirmation to an originating sender's communication device in a SMS communication system.

In another embodiment, a sender may wish to be notified not only when the sent SMS message was delivered but also when the recipient actually has read the SMS message. FIG. 3 is a message flow diagram illustrating the flow of messages between various components of the SMS communication system to provide the originating sender with a read confirmation message when the SMS message is displayed for reading by the recipient. The message flow is substantially similar to the message flow shown in FIG. 2 and transmits each of messages 401-411 described above. The original SMS message 401 may contain a read receipt request flag in the message header that has been set by the sender to request a read receipt. At some time either concurrent to or subsequent to the generation of the delivery acknowledgment (message 408), the recipient's communication device 140 may generate a SMS read receipt message. The read receipt message is transmitted from the recipient communication device 140 to the base station 145, message 412. The base station 145 relays the read receipt message to the SMSC 120, message 413. The SMSC 120 may in turn forward the read receipt message to the base station 115, message 414, for relay to the sender's communication device 110, message 415. In this manner, a sender may receive confirmation that the sent SMS message was read (or at least displayed) by the intended recipient.

Figure 4:
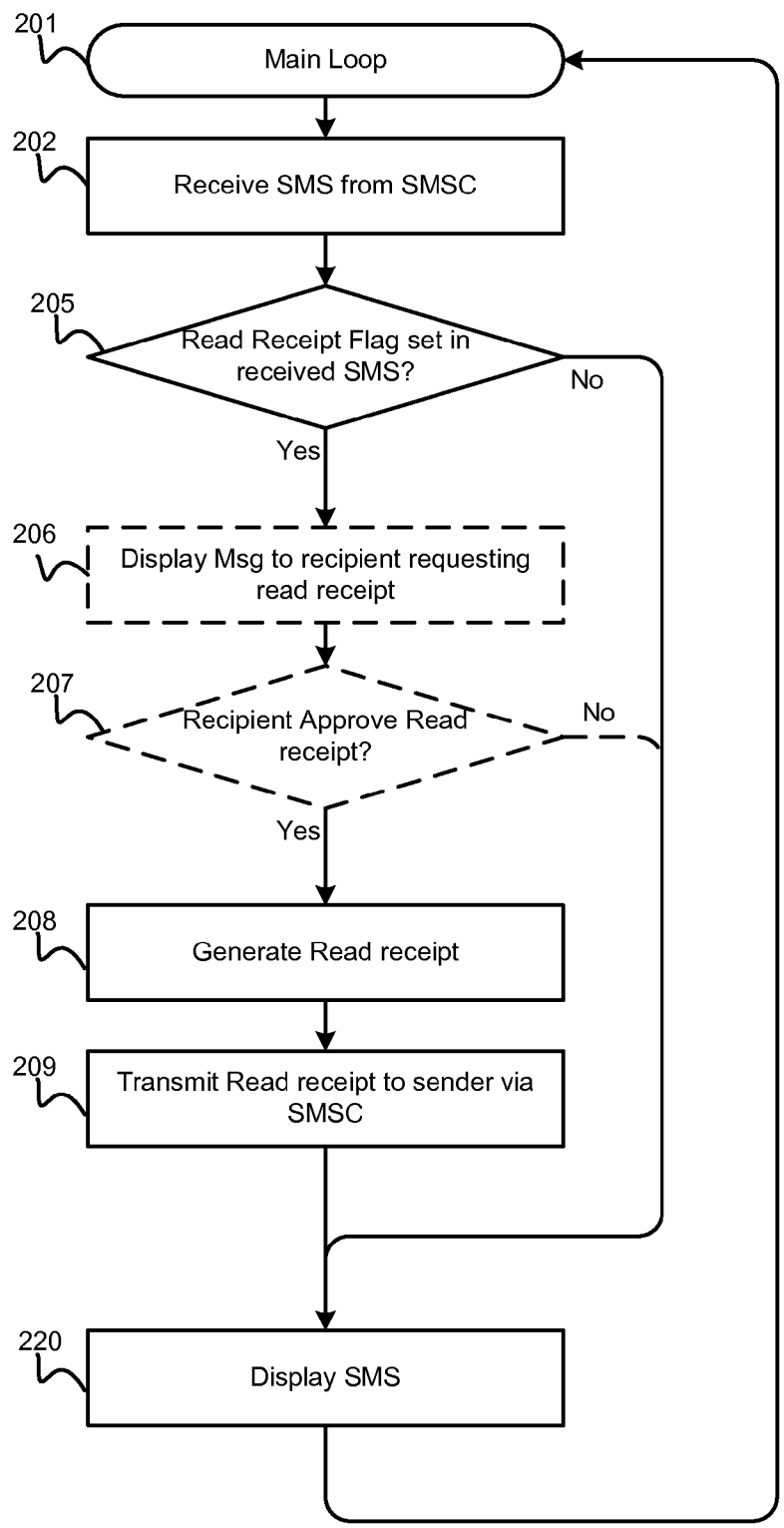
FIG. 4 is a process flow diagram illustrating steps of an embodiment method which provides a read receipt confirmation to an originating sender's communication device in a SMS communication system.

In order to generate the SMS read acknowledgement message, a SMS read confirmation request may be made by the sender and included in the original SMS message. For example, when generating the original SMS message, the sender may be presented with an option to request a read confirmation. If the sender responds to the option in the affirmative a read receipt request flag may be set in the message header of the SMS message indicating the read receipt request. FIG. 4 is a process flow diagram illustrating the steps that may be taken by the recipient's communication device in response to receipt of the SMS message with the read receipt request flag set. The processor of the recipient's communication device 140 may oversee a number of processes and operations being executed on the communication device in a main loop routine, step 201. The main loop may comprise a number of subroutines, loops and processes that are executed at various times in the main loop cycle. When a SMS message is received by the recipient's communication device 140 an interrupt may be signaled to the processor to initiate a subroutine within the main loop. Thus, during the operation of the main loop, the device 140 may receive an SMS message from the SMSC 120, step 202. Upon receipt, the processor examines the received SMS message header information to determine if the read receipt request flag has been set by the sender, determination 205. If the read receipt flag has not been set (i.e., determination 205=No), then the processor may store the SMS message in local memory for subsequent display to the recipient, step 220. Once stored the processor may return to the main loop routine, step 201.

However, if the sender has set the read receipt request flag (i.e., determination 205=Yes), then the processor may optionally display a message to the recipient on the display of the recipient's communication device 140 requesting the recipient to explicitly confirm the receipt and reading of the SMS, step 206. The recipient may affirmatively respond to the confirmation message displayed on the recipient's communication device display, determination 207. If the recipient confirms the reading of the received SMS message (i.e., determination 207=Yes), then the recipient's communication device processor may generate the read receipt, step 208. Once generated the recipient's communication device processor may transmit the read receipt back to the sender's communication device 110 via the SMSC 120, step 209 (see also messages 412-415 in FIG. 3). Once the read receipt is transmitted back to the sender, the recipient's communication device processor may store the SMS message for subsequent display to the recipient, step 220. Once stored the processor may return to the main loop routine, step 201.

In some instances, the recipient may wish to read the SMS payload text but not confirm reading the SMS message. In cases where the recipient may not confirm the read receipt request (i.e., determination 207=No), the recipient's communication device processor may continue to store the SMS message for subsequent display to the recipient, step 220. Alternatively, in an embodiment not shown, the recipient's communication device processor may prevent the display of the SMS message payload text until a confirmation of the read receipt request is made (i.e., return to step 206).

In embodiments where the optional steps of displaying a read receipt confirmation message to the recipient is omitted, the recipient's communication device processor may automatically generate and transmit the read receipt as the SMS message payload text is being displayed. Thus, once the SMS with read receipt flag set is received, the read receipt is automatically generated and transmitted (steps 208 and 209) as the SMS message is stored for subsequent display to the recipient, step 220. One of skill in the art would appreciate that the foregoing method descriptions and the process flow diagrams are provided merely as illustrative examples and are not intended to require or imply that the steps of the various embodiments must be performed in the order presented. For example, the SMS payload text may be stored (step 220) prior to the generation of the read receipt (step 208) or the display of a message to the recipient requesting the read receipt (step 206).

In other embodiments, the sender may request the deletion of a previously sent SMS message that is stored in local memory of either the recipient's communication device or the SMSC. In many instances, a sender may inadvertently send a SMS message to the wrong recipient address. In other instances, a sender may send a SMS message with an erroneous or inappropriate message payload. Regardless of the reason, the sender may wish to delete a previously sent SMS message. In cases where the recipient's communication device 140 has been turned off or out of range of a base station, the SMS message may still be located in the local memory of the SMSC 120. In other cases the SMS message may have been already delivered to recipient's communication device 140 and stored in local memory of the recipient's communication device 140 but not yet read by the recipient.

Figure 5:
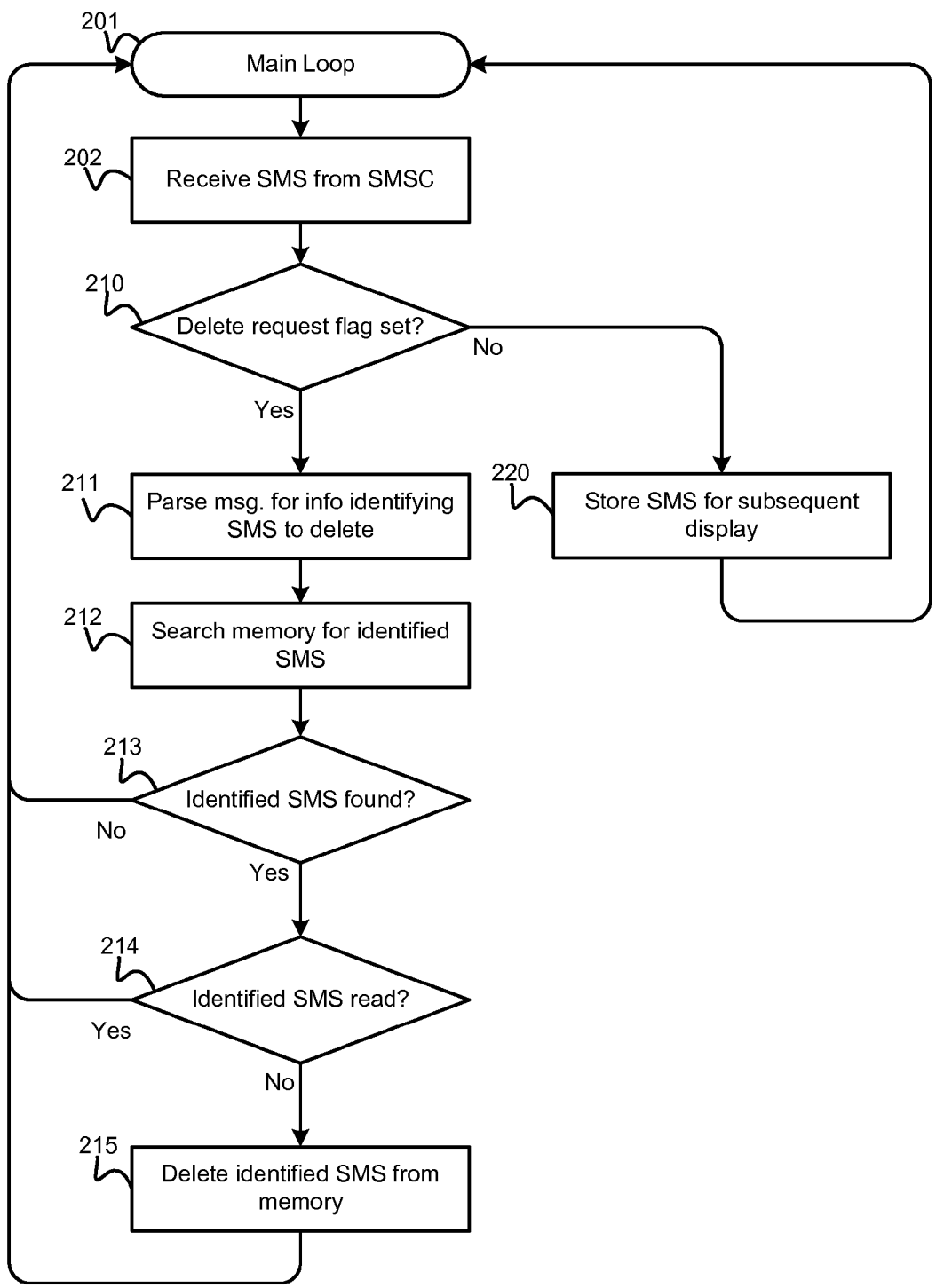
FIG. 5 is a process flow diagram illustrating steps of an embodiment method to delete a previously received SMS message from a recipient's communication device.

FIG. 5 is a process flow diagram illustrating steps to be performed by the recipient's communication device in response to a sender's request to delete a previously sent SMS message from the recipient communication device's memory. In order to initiate the process in the recipient's communication device 140, the sender may send a SMS message to the recipient's communication device 140 with a request to delete a specified previously sent SMS message. Such SMS message may set a delete request flag in the SMS message header indicating that the SMS message is a delete request.

During the operation of the main loop routine 201 the processor of the recipient's communication device 140 may receive the SMS message containing the delete request from the SMSC 120, step 202. The processor of the recipient's communication device 140 may examine the SMS message header to determine if the delete request flag has been set, determination 210. If the delete request flag has not been set (i.e., determination 210=No), then the processor of the recipient's communication device 140 may store the SMS message for subsequent display to the recipient, step 220. Once stored the processor may return to the main loop routine, step 201.

However, if the delete request flag is set (i.e., determination 210=Yes), then the processor of the recipient's communication device 140 may parse the received SMS message for information identifying a particular SMS message that was previously sent that the sender wishes to delete from the memory of the recipient's communication device 140, step 211. The identifying information may include, for example, the unique identifier (e.g., phone number) of the sender's communication device 110, the time the SMS message desired to be deleted was sent, and/or possible keywords contained in the SMS message payload text that may be searched. Using the identifying information contained in the received delete request SMS message, the processor of the recipient's communication device 140 may search the local memory for the identified SMS message, step 212. In an embodiment, SMS messages may include a unique identifier (ID), such as within the header portion, that is attached by the sending communication device. If a unique ID is included in SMS messages, a message delete request message may include the ID of the message as the information identifying the particular SMS message that the sender wishes to be deleted from local memory.

In some cases, the recipient may have already deleted the SMS message identified for deletion (either before or after reading). In such cases the SMS message identified for deletion may not be found in local memory (i.e., determination 213=No). Therefore, the processor of the recipient's communication device 140 may return to the main loop 201. If, however, the SMS message identified for deletion is found (i.e., determination 213=Yes), then the processor of the recipient's communication device 140 determines whether the SMS message identified for deletion has already been read, determination 214. If the SMS message identified for deletion has already been read, it will not be beneficial to subsequently delete the SMS message as it may just further draw attention to the mistaken or erroneous SMS message. Accordingly, if the SMS message identified for deletion has already been read (i.e., determination 214=Yes), then the processor of the recipient's communication device 140 may return to the main loop 201. If however, the SMS message identified for deletion has not been read (i.e., determination 214=No), then the identified SMS message may be deleted from local memory, step 215. The processor of the recipient's communication device 140 may then return to the main loop 201. In an alternative embodiment, determination 214 may be omitted. In such embodiments, if the SMS message identified for deletion is found in the memory of the recipient's communication device 140 (i.e., determination 213=Yes), then the identified SMS message may be deleted from local memory, step 215, regardless of whether the identified SMS message has been previously read.

Figure 6:
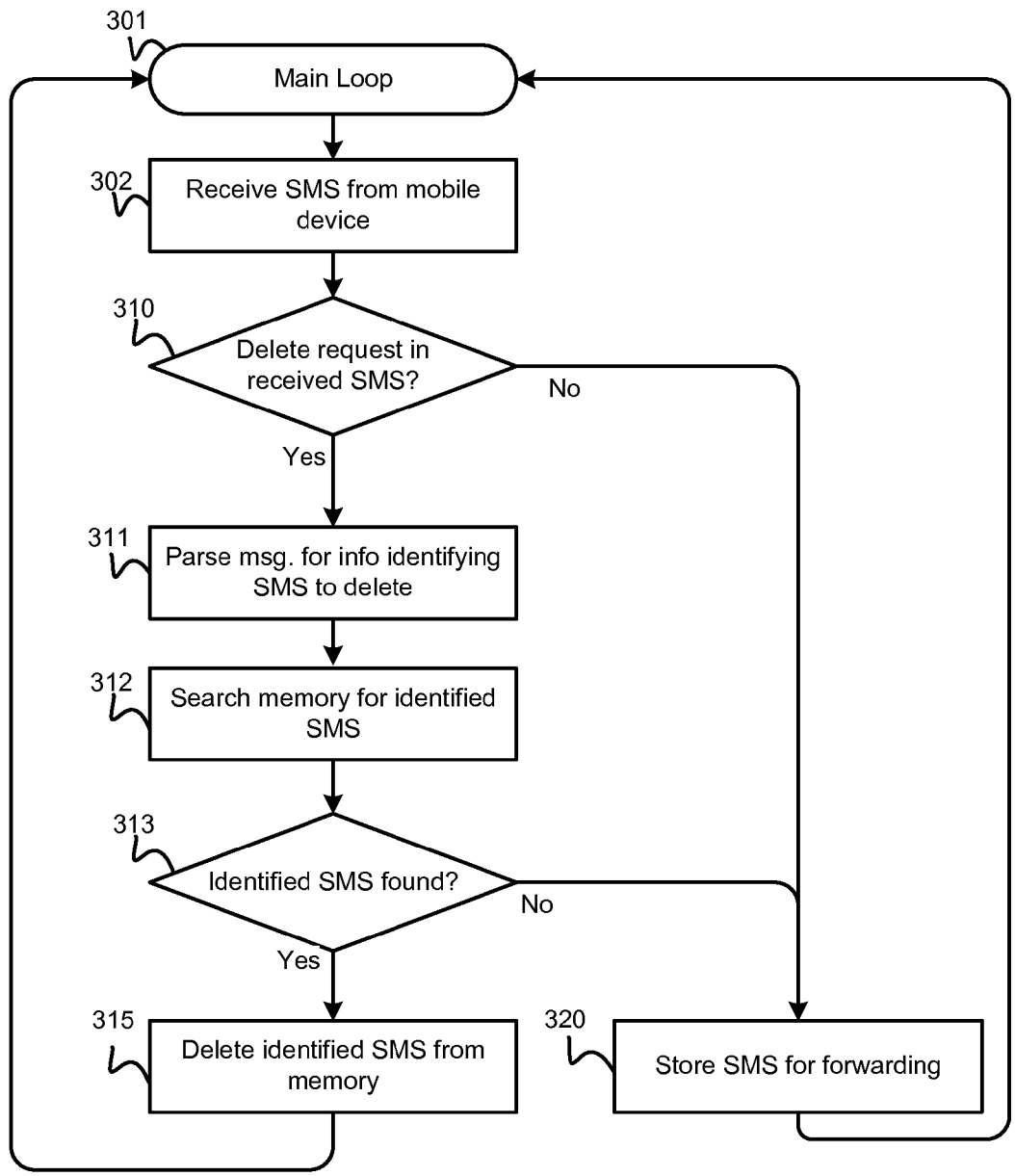
FIG. 6 is a process flow diagram illustrating steps of an embodiment method to delete a previously received SMS message from a SMSC.

In instances where the recipient's communication device 140 has not registered with a communication network since the time the SMS message identified for deletion was originally sent, the SMS message identified for deletion will still be located in the memory of the SMSC 120. FIG. 6 is a process flow diagram illustrating the steps taken by the SMSC 120 processor to delete a previously sent SMS message. Similar to the process flow shown in FIG. 5, the processor of the SMSC 120 executes a main loop routine 301. The processor of the SMSC 120 may receive a SMS message from a sender's communication device 110, step 302. The processor of the SMSC 120 may examine the received SMS message header to determine if the delete request flag has been set, determination 310. If the delete request flag has not been set (i.e., determination 310=No), then the processor of the SMSC 120 may store the received SMS for subsequent forwarding to the recipient's communication device 140, step 320. Once stored the processor of the SMSC 120 may return to the main loop routine, step 301.

However, if the delete request flag is set (i.e., determination 310=Yes), then the processor of the SMSC 120 may parse the received SMS message for information identifying the SMS message to be deleted from the memory of the SMSC 120, step 311. Using the identifying information contained in the received delete request SMS message, the processor of the SMSC 120 may search the local memory for the identified SMS message, step 312. In cases where the recipient's communication device 140 has been registered with a communication network, the SMS message identified for deletion may have already been forwarded to the recipient's communication device 140 and therefore no longer present in the SMSC 120 memory. In such cases the SMS message identified for deletion will not be found in the SMSC 120 memory (i.e., determination 313=No). Accordingly, in order to delete the SMS message from the recipient's communication device 140 (see FIG. 5) the received delete request SMS message is stored for forwarding to the recipient's communication device, step 320. In this manner, the sender's delete request may still be performed by the recipient's communication device 140 as discussed above with reference to FIG. 5. Once stored the processor of the SMSC 120 may return to the main loop routine, step 301. However, if the SMS message identified for deletion is found (i.e., determination 313=Yes), then the processor of the SMSC 120 may delete the identified SMS message from memory so that it is never forwarded on to the recipient's communication device 140, step 315. Once deleted, the processor of the SMSC 120 may return to the main loop routine, step 301.

In another embodiment, the sender may recall a previously sent SMS message and replace it with a revised SMS message. In many instances, a sender may discover mistakes in an SMS message after the sender has already transmitted the message. In order to correct the mistake, the sender may send a subsequent message to the recipient to disregard the earlier sent SMS message in favor of the subsequent SMS message. This crude approach may result in confusion for the recipient as multiple SMS messages that may contain conflicting information may be received. In cases where the recipient's communication device 140 has been turned off or out of range, the SMS message identified for recall and replacement may still be located in the local memory of the SMSC 120. In other cases the SMS message identified for recall and replacement may have been delivered to recipient's communication device 140 but not yet read by the recipient.

Figure 7:
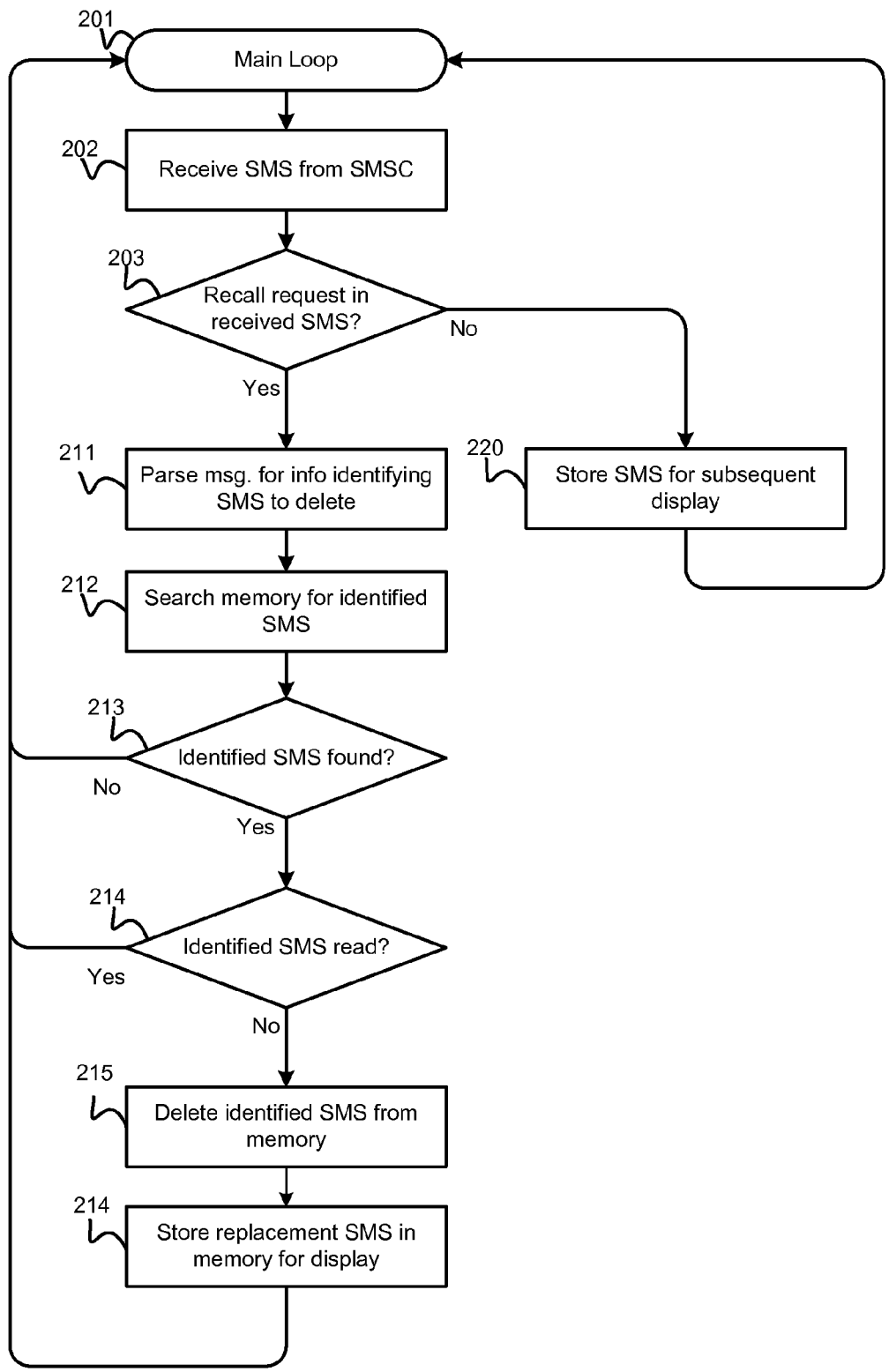
FIG. 7 is a process flow diagram illustrating steps of an embodiment method to recall/replace a previously received SMS message with a new SMS message in a recipient's communication device.

FIG. 7 is a process flow diagram illustrating steps to be performed by the recipient's communication device in response to a sender's request to recall and replace a previously sent SMS message with a revised SMS message. In order to initiate the process in the recipient's communication device 140, the sender must send a revised SMS message to the recipient's communication device with a request to recall a specified previously sent SMS message. Such a revised SMS message may set a recall/replace request flag in the SMS message header indicating that the SMS message is a recall/replace request. In addition, the revised SMS message may contain information to identify the previously sent SMS message to recall and replace.

The process flow of FIG. 7 is similar to the process flow illustrated in FIG. 5. However, the processor of the recipient's communication device may examine the received revised SMS message for a recall/replace flag instead of a delete request flag, determination 203. If the recall/replace flag is not set (i.e., determination 203=No), then the processor of the recipient's communication device 140 stores the SMS message for subsequent display to the recipient, step 220. In addition, similar to the process flow in FIG. 5, if the recall/replace flag is set (i.e., determination 203=Yes), then the processor of the recipient's communication device 140 continues to perform steps 211-215 as described above with reference to FIG. 5. Some time after the SMS message identified for deletion has been deleted (or immediately after the identified SMS message has been deleted) the revised SMS message text contained in the payload of the received revised SMS message may be stored to the memory of the recipient's communication device 140 for subsequent display to the recipient, step 214. Once the received revised SMS message text has been stored to local memory the processor may return to the main loop routine, step 201.

Figure 8:
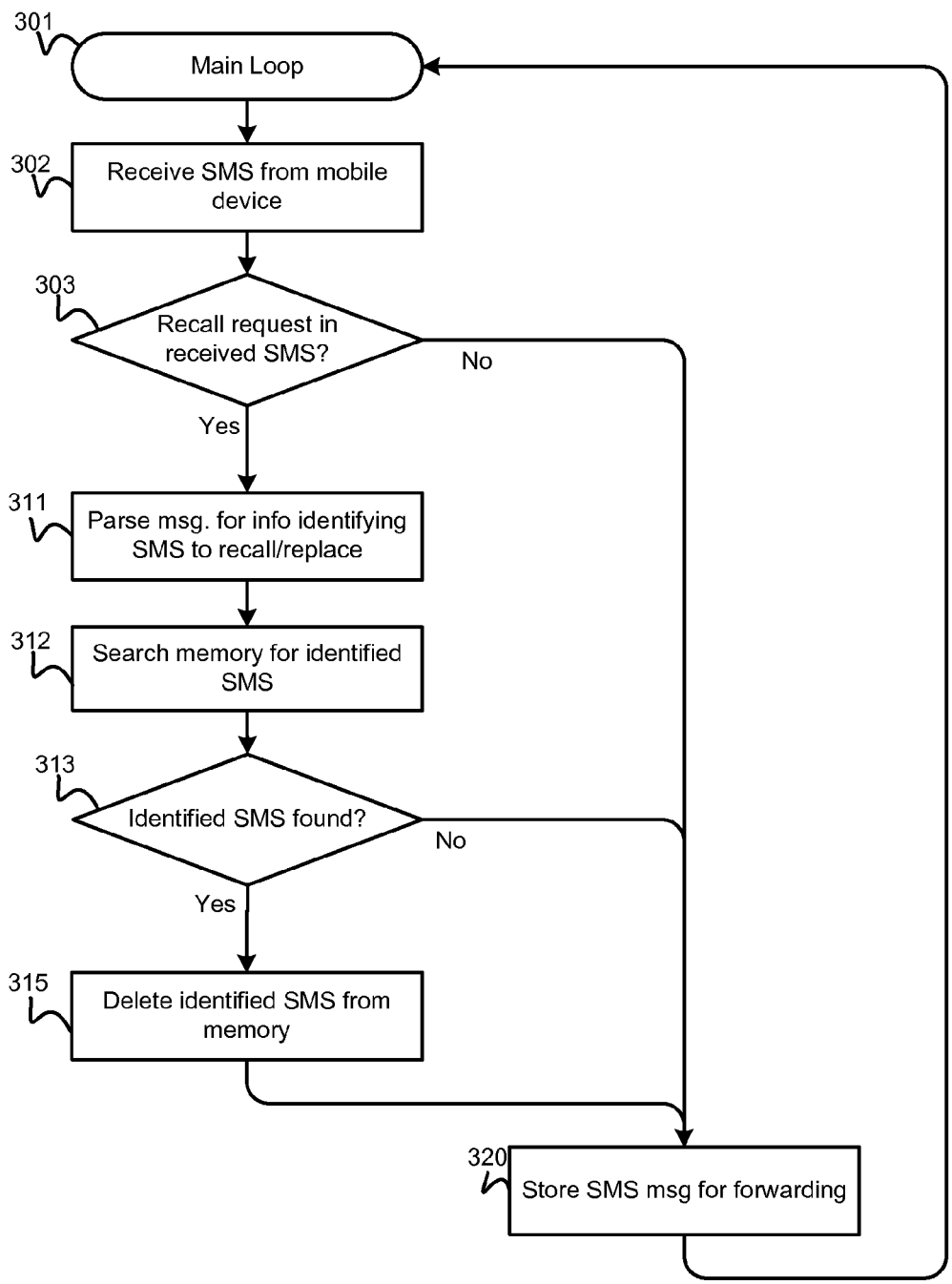
FIG. 8 is a process flow diagram illustrating steps of an embodiment method to recall/replace a previously received SMS message with a new SMS message in a SMSC prior to forwarding to a recipient's communication device.

In instances where the recipient's communication device 140 has not registered with a communication network since the time the SMS message identified for recall and replacement was originally sent, the SMS message identified for recall and replacement will still be located in the memory of the SMSC 120. FIG. 8 is a process flow diagram illustrating the steps taken by the SMSC 120 processor to recall and replace a previously sent SMS message with a revised SMS message. The process flow of FIG. 8 is similar to the process flow illustrated in FIG. 6. However, the processor of the SMSC 120 may examine the received revised SMS message for a recall/replace flag instead of a delete request flag, determination 303. Similar to the process flow in FIG. 6, if the recall/replace flag is not set (i.e., determination 303=No), then the processor of the SMSC 120 stores the received SMS message for subsequent forwarding to the recipient's communication device 140, step 320. In addition, similar to the process flow in FIG. 6, if the recall/replace flag is set (i.e., determination 303=Yes), then the processor of the SMSC 120 continues to perform steps 311-315 as described above with reference to FIG. 6. Some time after the SMS message identified for recall/replacement has been deleted (see step 315) the revised SMS message text contained in the payload of the received revised SMS message may be stored to the memory of the SMSC 120 for subsequent forwarding to the recipient's communication device 140, step 320. This revised SMS message may be stored to the memory of the SMSC 120 for subsequent forwarding to the recipient's communication device 140 immediately after the SMS message identified for recall/replacement has been deleted. Once the received revised SMS message text has been stored to local memory for forwarding, the processor of the SMSC 120 may return to the main loop routine, step 301.

In another embodiment, the sender may send a SMS message that will self destruct (i.e., delete itself from memory) upon the occurrence of an expiration event. In many instances, a sender may send a SMS message that is only relevant for a limited duration of time. For example, a sender may wish to invite a recipient to an impromptu meeting at a location (e.g., restaurant, bar, park, etc.). However, the sender may only plan to be at the location for a predetermined period of time. Therefore, the sender may send the recipient an SMS inviting the recipient to meet the sender at the location. However, the sender may want to avoid the situation where the recipient does not receive the SMS message until well after the sender has already left the location. There may be a variety of reasons causing the recipient to receive the SMS message well after the sender has already left the location. For example, the recipient may have its communication device turned off or out of range of a base station for an extended period of time. Alternatively, the SMS message may have been delivered to the recipient in a timely manner, but the recipient does not read the received SMS message until after the predetermined period of time has elapsed. By providing the sender with the ability to set an expiration date/time for the SMS messages, the sender can insure that only relevant SMS messages are either delivered to the recipient or still in local memory for reading by the recipient.

Figure 9:
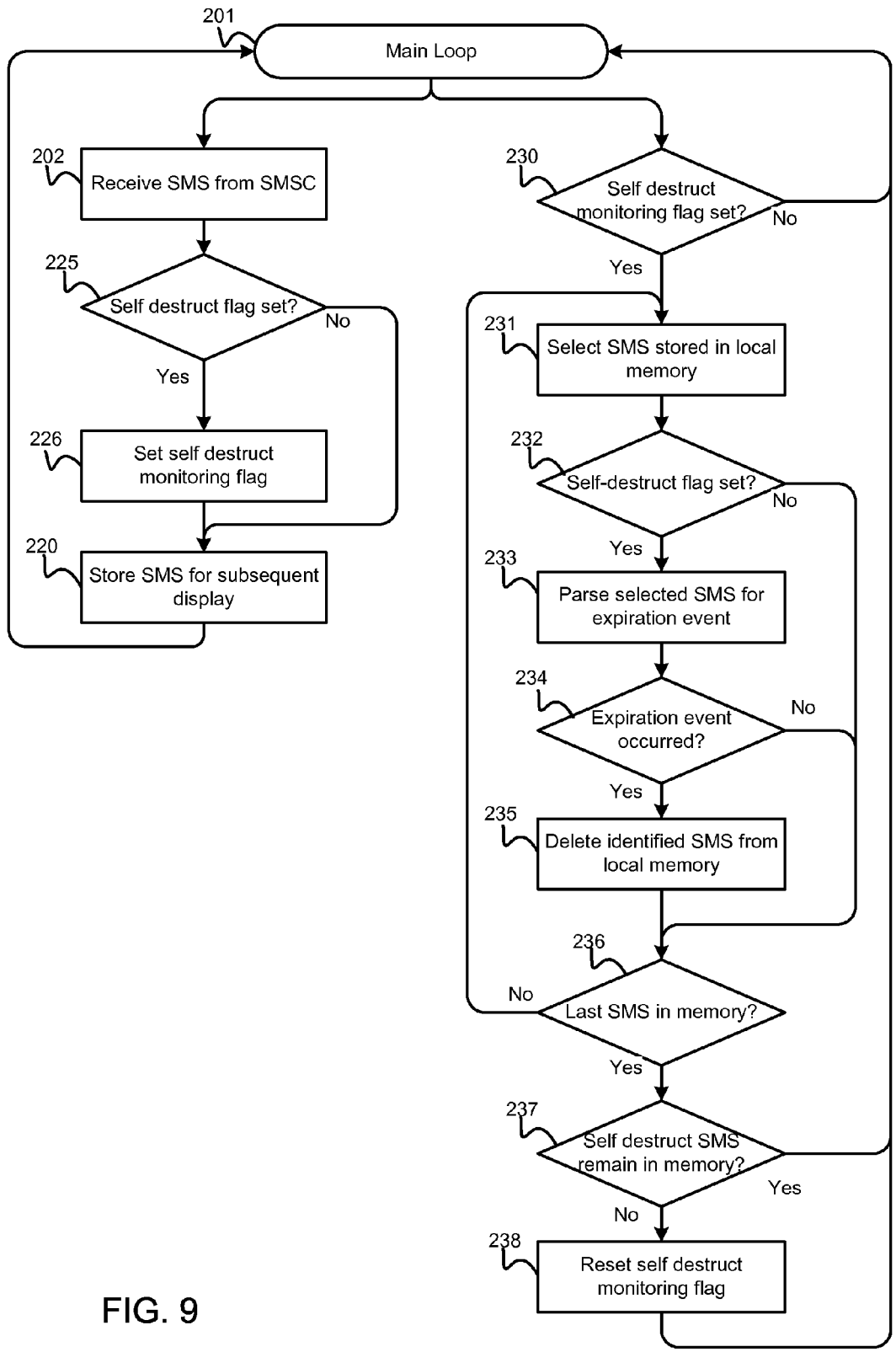
FIG. 9 is a process flow diagram illustrating steps of an embodiment method to delete a previously received SMS message upon an expiration event set by the sender of the SMS message in a recipient's communication device.

FIG. 9 is a process flow diagram illustrating steps to be performed by the recipient's communication device 140 in response to receipt of a sender's self destructing SMS message. In order to initiate the self destruct process in the recipient's communication device 140, the sender must send a SMS message to the recipient's communication device 140 with a request to self destruct the SMS message at a predetermined date/time. Such a self-destructing SMS message may set a specified flag in the SMS message header indicating that the SMS message has a specified self destruct date/time. In addition, such a self-destructing SMS message may contain the date and time for self destruction in either the message header or as part of the message payload.

During the operation of the main loop routine the processor of the recipient's communication device 140 may receive the SMS message containing the self destruction request and details from the SMSC 120, step 202. The processor of the recipient's communication device 140 may examine the SMS message header to determine if the self-destruct request flag has been set, determination 225. If the self-destruct request flag has not been set (i.e., determination 225=No), then the processor of the recipient's communication device 140 may assume that the received SMS message is a conventional type SMS message and store the SMS message for subsequent display to the recipient, step 220. Once stored the processor may return to the main loop routine, step 201.

However, if the self destruction request flag is set (i.e., determination 225=Yes), then the processor of the recipient's communication device 140 may set a separate flag in a memory location to indicate that a SMS message has been received that requires a self destruction monitoring loop to be performed, step 226. Once the self destruction monitoring loop flag has been set in memory, the processor of the recipient's communication device 140 may store the SMS message for subsequent display to the recipient, step 220. Once stored the processor may return to the main loop routine, step 201.

As part of the main loop routine 201, the processor of the recipient's communication device 140 may periodically check to see if the self destruction monitoring loop flag has been set, determination 230. If the self destruction monitoring loop flag has not been set (i.e., determination 230=No), then the processor of the recipient's communication device 140 may return the main loop, step 201. If the self destruction monitoring loop flag has been set (i.e., determination 230=Yes), then the processor of the recipient's communication device 140 may select a SMS message stored in local memory to determine if the selected SMS message is due to be self destructed, step 231. For example, the processor of the recipient's communication device 140 may sequentially select each SMS message stored in local memory in a first in-first out (FIFO), or last in-first out (LIFO), or last in-last out (LILO) order. Once selected the processor may determine if a self-destruct flag is set in the self destruct monitoring loop routine, determination 232. For example, the processor may examine the SMS message header to see if the self destruct request flag has been set. If the self destruct flag is not set (i.e., determination 232=No), then the processor of the recipient's communication device 140 may determine if the local memory contains another SMS message, determination 236.

If however, the self destruct flag is set (i.e., determination 232=Yes), then the processor of the recipient's communication device 140 parses the SMS message to determine the expiration event to monitor for self destruction, step 233. For example, the expiration event may be a specific date and/or time. Alternatively, the expiration event may be when some period of time has elapsed so that the SMS message has "aged" in memory (i.e., been stored for a pre-determined period of time). Still further, the expiration event may be an independent event or action that may be used to trigger the deletion of the SMS message. For example, the expiration event may be the launch of an application or game on the communication device 140 by the recipient. The processor of the recipient's communication device 140 may then determine whether the expiration event has occurred, determination 234. If the expiration event has occurred (i.e., determination 234=Yes), then the currently selected SMS message may be deleted from local memory, step 235. Once deleted the processor of the recipient's communication device 140 may determine whether another SMS message is stored in memory to select or if the most recently selected SMS message was the sequentially last SMS message to check in memory, determination 236. However, if the expiration event has not occurred (i.e., determination 234=No), then the processor of the recipient's communication device 140 may determine whether another SMS message is stored in memory to select or if the most recently selected SMS message was the sequentially last SMS message to check in memory, determination 236, without deleting the SMS message. A SMS message whose expiration event has not occurred will remain in local memory. If there are additional SMS messages to select in memory (i.e., determination 236=No), then the processor may sequentially select the next SMS message stored in memory to determine if the selected SMS message is due to be self destructed, step 231.

However, if the last SMS message in memory has been selected and checked (i.e., determination 236=Yes), then the processor may determine if any self destructing SMS messages remain in memory, determination 237. As discussed above, if the expiration event for a particular SMS message has not yet occurred, the SMS message will remain in memory. Accordingly, if any self destructing SMS messages remain in memory (i.e., determination 237=Yes), then the processor returns to the main loop 201 without resetting the self destruct monitoring loop flag (step 238). However, if no self destructing SMS message remain in memory (i.e., determination 237=No), then the processor may reset the self destruct monitoring loop flag, step 238, and then return to the main loop 201.

As an alternative embodiment, when the SMS message is originally received and stored for subsequent display (step 220), SMS messages with the self-destruct flag may be stored in a different memory location. By storing the self-destructing SMS message in a different memory location, the processor may omit the step of checking to see if the self-destruct flag is set (step 232) as all SMS messages stored in the different memory location will have a self-destruct flag set.

Figure 10:
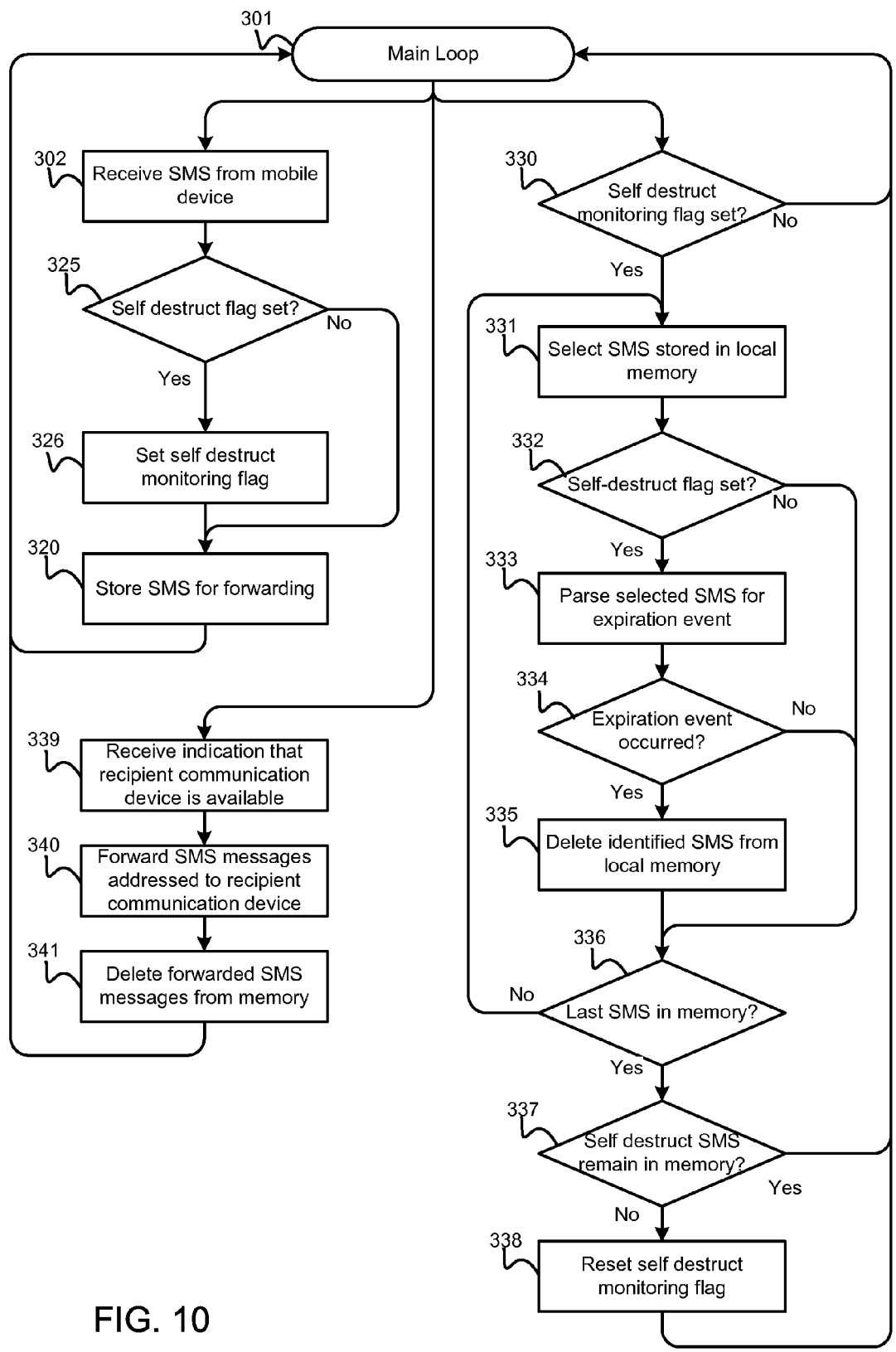
FIG. 10 is a process flow diagram illustrating steps of an embodiment method to delete a previously received SMS message upon an expiration event set by the sender of the SMS message in a SMSC prior to forwarding to a recipient's communication device.

In instances where the recipient's communication device 140 has not registered with a communication network since the time the self destructing SMS message was originally sent, the self destructing SMS message will still be located in the memory of the SMSC 120. FIG. 10 is a process flow diagram illustrating the steps taken by the SMSC 120 processor to provide for a self destructing SMS message. The process flow illustrated in FIG. 10 is substantially similar to the process flow illustrated in FIG. 9. The steps 201, 202, 220, 225, 226, 230-238 of the process flow depicted in FIG. 9 to be performed by the recipient's communication device 140, respectively correspond to steps 301, 302, 320, 325, 326, 330-338 of the process flow depicted in FIG. 10 to be performed by the SMSC 120. Slight variations to the steps may occur. For example, step 302 corresponds to step 202, however rather than receiving the SMS message from the SMSC 120, the SMSC 120 receives the message from the sender's communication device 110 via the base station 115 and communication network 150. In addition, step 320 corresponds to step 220, however rather than store the SMS message for display, the SMSC 120 stores the message for forwarding to the recipient's communication device 140. In addition, during execution of the main loop 301 the SMSC 120 may receive an indication that a recipient's communication device 140 is now available (i.e., turned on and registered to a base station), step 339. In response to the receipt of this indication, the SMSC 120 may forward to the recipient's communication device 140 all SMS message stored in the SMSC 120 local memory addressed to the recipient's communication device 140, step 340. Once these SMS messages have been properly forwarded to the recipient's communication device 140, the SMS messages may be deleted from the SMSC 120 memory, step 341. In this manner, the SMSC 120 may not consider these forwarded SMS messages the next time the self destruct monitoring loop routine is performed.

Figure 11:
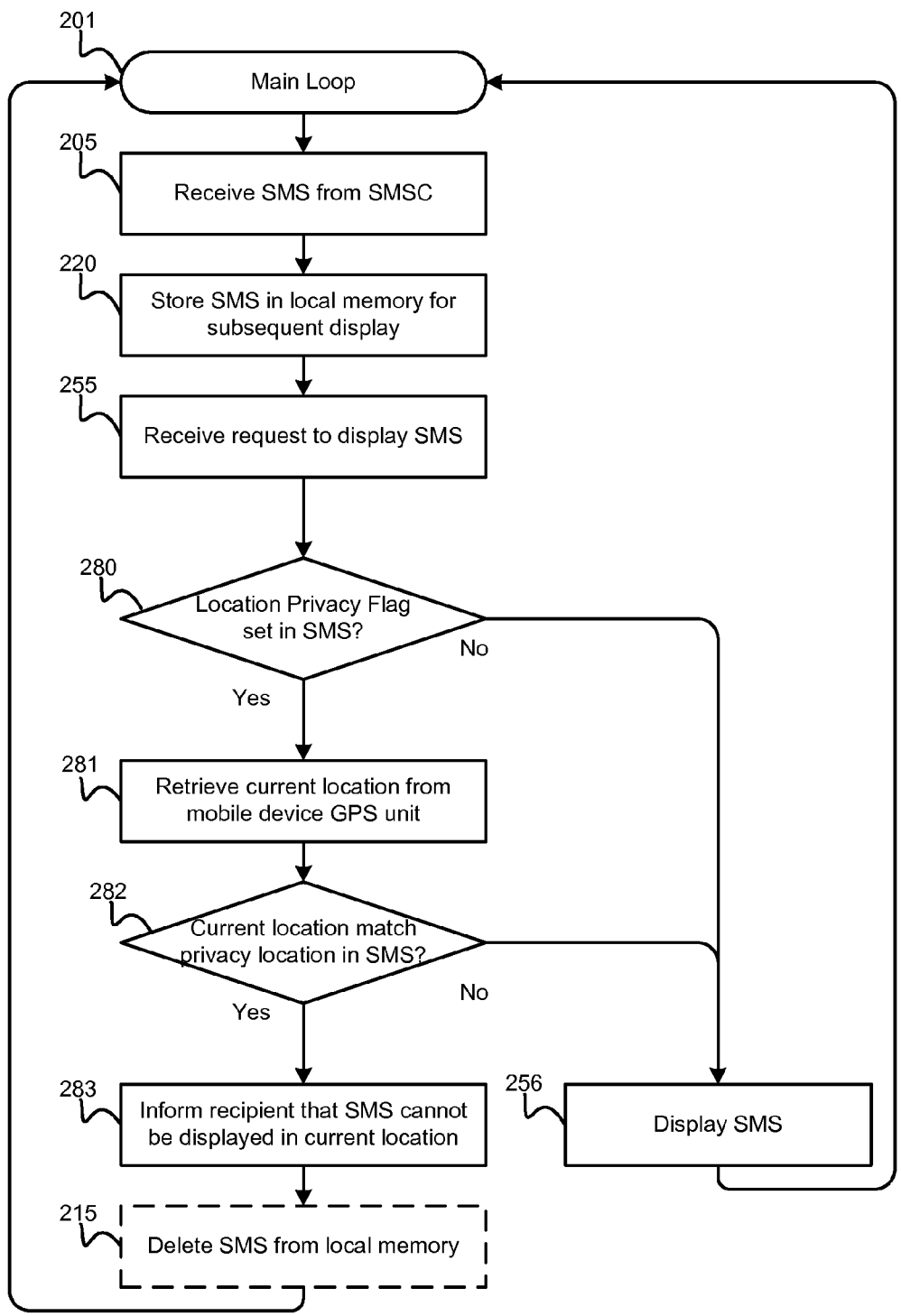
FIG. 11 is a process flow diagram illustrating steps of an embodiment method to prevent the display of a SMS message by a recipient's communication device in certain locations.

In another embodiment, the sender of a SMS message may be able to prevent the display of a SMS message in a particular location. For example, a sender may send a SMS message that contains an audio file (i.e., a MMS message) that may embarrass the recipient if opened in the wrong location. For example, it may not be appropriate to open a musical ringtone message in the recipient's office, place of worship, classroom, etc. The recipient may not be aware of the content of the SMS message until after the recipient already opens the message. In order to prevent a potentially embarrassing situation for the recipient, the sender (knowing the content of the message) may set a privacy flag and include GPS coordinates of locations that prevent the SMS message from being opened if it is detected that the recipient's communication device 140 is present in those identified locations. FIG. 11 is a process flow diagram illustrating steps that may be taken in an embodiment method that allows a sender to prevent a recipient from opening a SMS message in specified locations. The embodiment method illustrated in FIG. 11 may be performed by the recipient's communication device 140. In order to prevent a recipient from opening the sender's SMS message in a specified location, the sender may set a privacy flag in the SMS message header indicating the desire to prevent opening the SMS message in specified locations. In addition, the sender may specify GPS coordinates of locations that the SMS message may not be opened. In alternative embodiments, the sender may be able to include location names that may be cross referenced into specific GPS coordinates by either the recipient's or sender's communication device. The locations identified by the sender may also be identified by other location indicators. For example, locations may be cross referenced to specific base stations that a recipient's communication device may be currently registered with. For sake of simplicity, the embodiment may be described using GPS coordinates. However, one of skill in the art may appreciate that any of a number of location identifiers may be used and implemented by the embodiment method.

Similar to many of the other embodiments disclosed above, the recipient's communication device 140 may receive the SMS message containing the privacy request from the SMSC 120, step 202. The SMS message may be stored in local memory for subsequent display to the recipient, step 220. The processor of the recipient's communication device 140 may receive a request to display the SMS message, step 255. Upon receipt of the display request, the processor of the recipient's communication device 140 may examine the SMS message header to determine if the sender of the SMS message set the privacy flag, determination 280. If the sender did not set the privacy flag (i.e., determination 280=No), then the processor may display the SMS message, step 256. Once the SMS message has been displayed, the processor may return to the main loop, step 201.

However, if the sender did set the privacy flag (i.e., determination 280=Yes), then the processor may retrieve the current location of the recipient's communication device 140, step 281. In order to determine the location of the recipient's communication device 140, the processor may interrogate an internal GPS receiver unit in the recipient's communication device to obtain current GPS coordinates. Alternatively, the processor may be able to discern the present location by determining the identity of the base station 145 that the recipient's communication device 140 is currently registered with. Any of a number of methods may be used to determine the current location of the recipient's communication device 140. The determined current location may be compared with the locations specified by the sender as locations to prevent display of the SMS message. These locations may be included in the message header or message payload. If the current location of the recipient's communication device 140 does not match any of the locations specified by the sender as a location to prevent display of the SMS message (i.e., determination 282=No), then the processor may display the SMS message 256.

However, if the current location of the recipient's communication device 140 does match any of the locations specified by the sender as a location to prevent display of the SMS message (i.e., determination 282=Yes), then the processor may inform the recipient that the sender has requested that SMS message not be displayed in the current location, step 283. The processor may optionally inform the recipient of locations specified by the sender as locations to prevent display of the SMS message. Alternatively, the processor may optionally inform the recipient of locations in which the SMS message may be displayed. The processor may also optionally delete the SMS message if the recipient attempts to display the SMS message in a location that is specified by the sender as a location to prevent display of the SMS message, step 215. Once the recipient has been informed of the sender's desire to prevent display of the message in the recipient's current location (and optionally the SMS message is deleted), the processor may return to the main loop, step 201.

Figure 12:
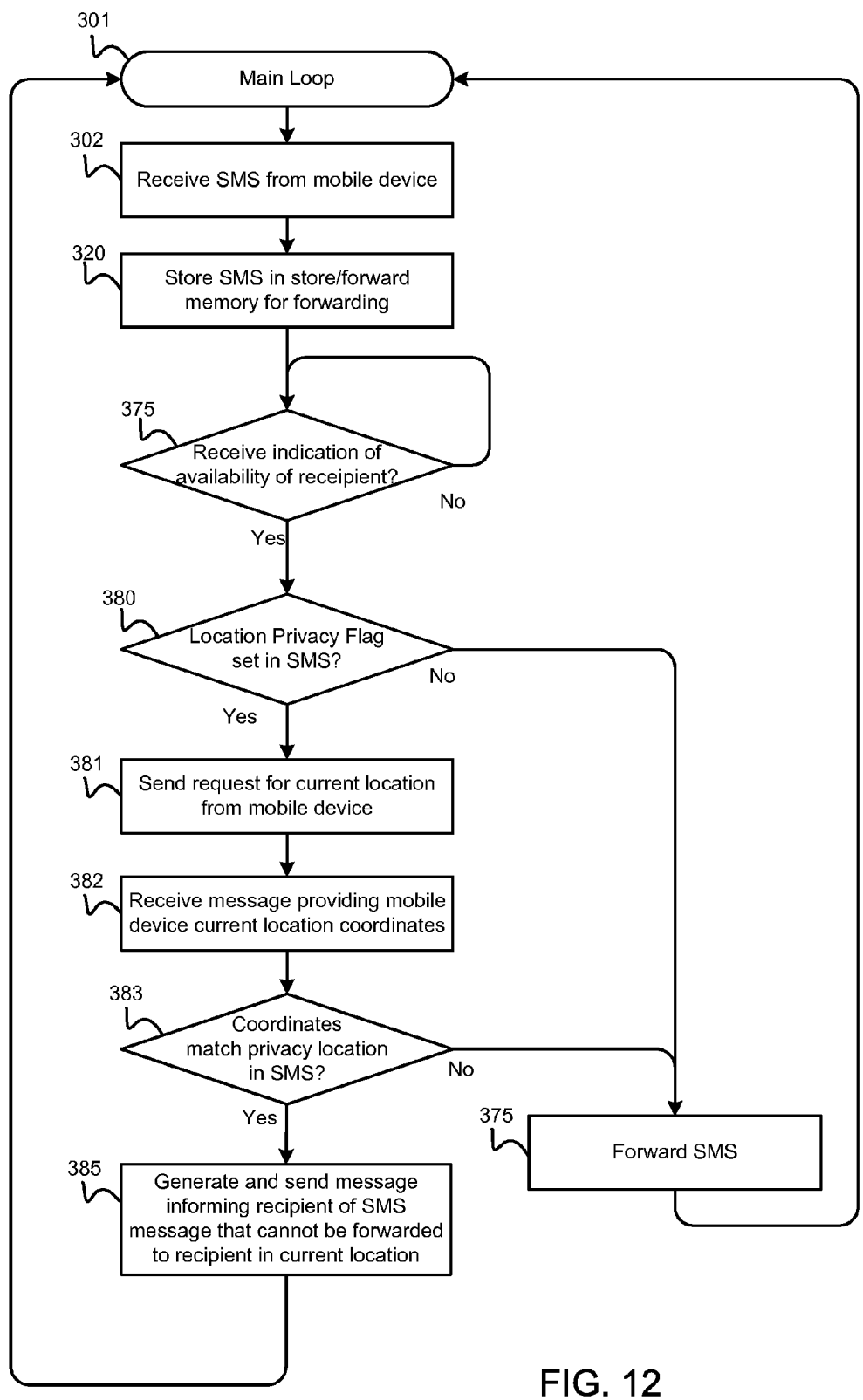
FIG. 12 is a process flow diagram illustrating steps of an embodiment method to prevent the forwarding of a SMS message to a recipient's communication device by a SMSC when the recipient's communication device is in certain locations.

In an alternative embodiment, the SMSC 120 may prevent the recipient's communication device 140 from even receiving the SMS message if it is determined that the recipient's communication device 140 is in a location specified by the sender as a location to prevent display of the SMS message. FIG. 12 is a process flow diagram of steps performed by a SMSC 120 to prevent the forwarding of an SMS message to a recipient's communication device 140 if the recipient's communication device 140 is currently located in a location specified by the sender as a location to prevent display of the SMS message. The processor of the SMSC 120 may execute a main loop routine 301. During the execution of the main loop routine 301, the processor of the SMSC 120 may receive a SMS message from a sender's communication device 110, step 302. The processor of the SMSC 120 may store the SMS message for forwarding to the recipient's communication device 140. When a recipient's communication device 140 registers with a communication network an indication that the recipient's communication device 140 is available to receive SMS messages from the SMSC 120 is sent to the SMSC 120.

If no indication that the recipient's communication device 140 is available is received by the SMSC 120 (i.e., determination 375=No), then the processor of the SMSC 120 may continue to await an indication that the recipient's communication device 140 is available. One of skill in the art may appreciate that the SMSC 120 may return to the main loop routine 301 to execute other functions or nested loops while it awaits the indication.

If the indication that the recipient's communication device 140 is available is received by the SMSC 120 (i.e., determination 375=Yes), then the processor of the SMSC 120 may examine the received SMS message header to determine if the privacy flag has been set by the sender, determination 380. If the privacy flag has not been set (i.e., determination 380=No), then the processor of the SMSC 120 may forward the SMS message to the recipient's communication device 140, step 375. Once the SMS message is forwarded, the processor of the SMSC 120 may return to the main loop routine, step 301. If, however, the privacy flag has been set (i.e., determination 380=Yes), then the processor of the SMSC 120 may send a request to the recipient's communication device 140 to obtain the current location of the recipient's communication device 140, step 381. In response to the request, the SMSC 120 awaits and receives a message from the recipient's communication device 140 with information regarding the current location of the recipient's communication device 140. The SMSC 120 processor then determines if the current location of the recipient's communication device 140 matches any of the locations specified by the sender as a location to prevent display of the SMS message, determination 382. In an alternative embodiment, the SMSC 120 may interrogate the HLR 130 to determine the base station 145 with which the recipient's communication device 140 is registered. By determining the base station 145 with which the recipient's communication device 140 is registered, the SMSC 120 may discern the current location of the recipient's communication device 140, albeit to a relatively large range. Various embodiments may employ any of a number of methods to obtain the current location of the recipient's communication device 140.

If the current location of the recipient's communication device 140 does not match any of the locations specified by the sender as a location to prevent display of the SMS message (i.e., determination 382=No), then the processor of the SMSC 120 may forward the SMS message to the recipient's communication device 140, step 375. However, if the current location of the recipient's communication device 140 does match any of the locations specified by the sender as a location to prevent forwarding of the SMS message (i.e., determination 382=Yes), then the processor of the SMSC 120 may generate and send a message to the recipient's communication device 140 informing the recipient that a SMS message has been received but cannot be forwarded to the recipient's communication device 140 in the current location, step 385. The message informing the recipient of the received SMS message may further inform the recipient of the locations specified by the sender as locations to prevent forwarding of the SMS message so that the recipient may change locations to one that is not specified by the sender as a location to prevent forwarding of the SMS message. Once the message informing the recipient of the received SMS message, the SMSC 120 processor may return to the main loop routine 301.

Figure 13:
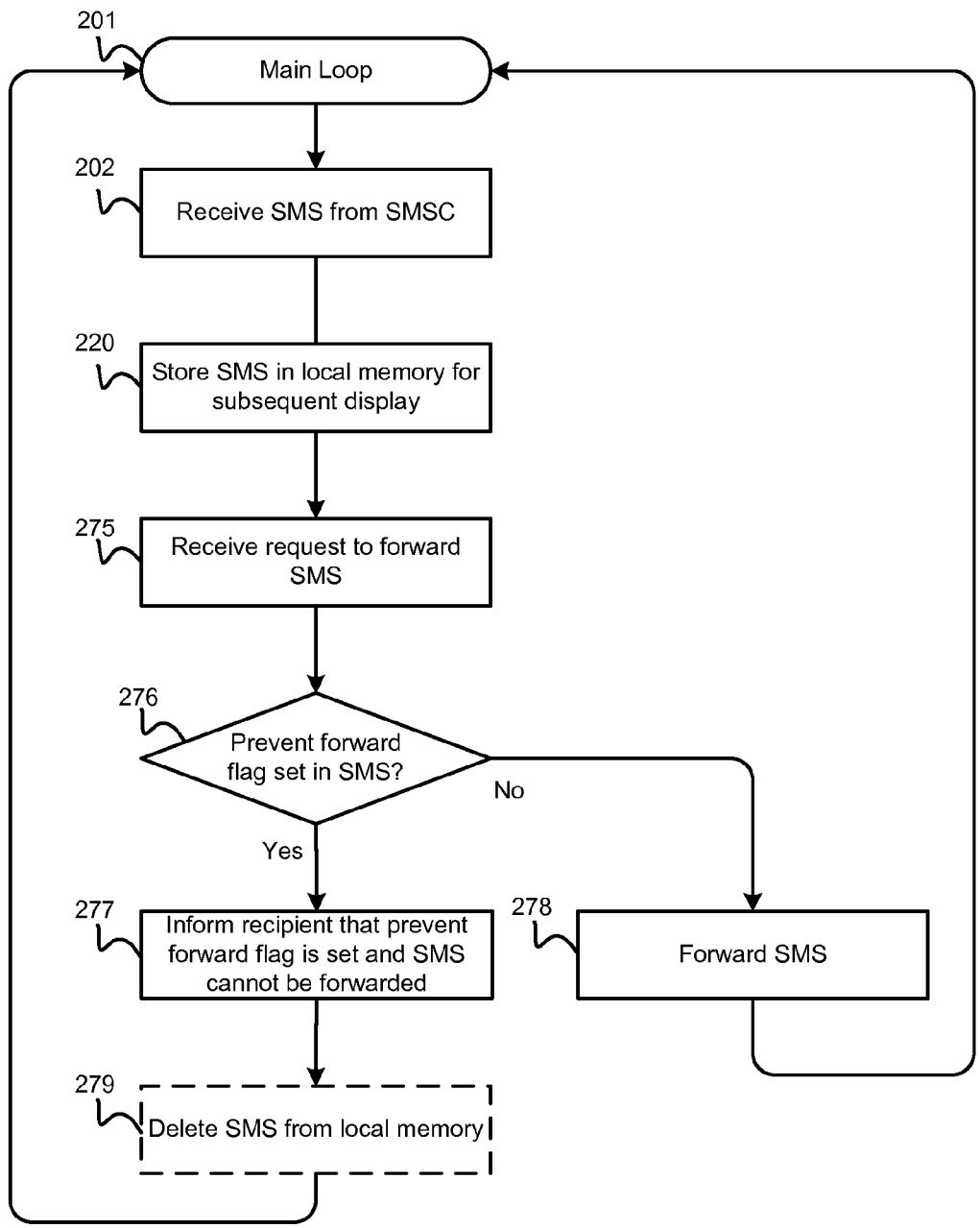
FIG. 13 is a process flow diagram illustrating steps of an embodiment method to prevent the forwarding of a SMS message by a recipient's communication device.

In another embodiment, a sender of a SMS message may prevent a recipient of the SMS message from intentionally or unintentionally forwarding the SMS message to another recipient. FIG. 13 is a process flow diagram illustrating steps that may be taken in an embodiment method that allows a sender to prevent a recipient from forwarding a SMS message. The embodiment method illustrated in FIG. 13 may be performed by the recipient's communication device 140. In order to prevent a recipient from forwarding the sender's SMS message, the sender may set a prevent forwarding flag in the SMS message header indicating the desire to prevent forwarding of the SMS message. During the operation of the main loop routine the processor of the recipient's communication device 140 may receive the SMS message containing the prevent forwarding request from the SMSC 120, step 202. The SMS message may be stored in local memory for subsequent display to the recipient, step 220. The processor of the recipient's communication device 140 may receive a request to forward the SMS message to another recipient communication device, step 275. Upon receipt of the forwarding request, the processor of the recipient's communication device 140 may examine the SMS message header to determine if the sender of the SMS message set the prevent forwarding flag, determination 276. If the sender did not set the prevent forwarding flag (i.e., determination 276=No), then the processor may forward the SMS message to the desired forwarding recipient communication device, step 278. Once the SMS message has been forwarded, the processor may return to the main loop, step 201. However, if the sender set the prevent forwarding flag (i.e., determination 276=Yes), then the processor may inform the recipient of the sender's desire to prevent forwarding of the SMS message, step 277. The processor may also optionally delete the SMS message from memory, step 279. Once the recipient has been informed of the sender's desire to prevent forwarding (and optionally the SMS message is deleted), the processor may return to the main loop, step 201.

As discussed above, the various embodiments provide the sender with enhanced SMS, EMS, MMS services to manipulate the handling, storage and processing of short messages. Senders may request the enhanced services by setting any of a variety of flags in a message header which may be examined by either the processor of a recipient's communication device 140 or the processor of a SMSC 120. Additional enhanced SMS, EMS, and MMS services may be requested or implemented by the recipient. Various embodiments allow a recipient to input preferences and/or settings in various lists or tables stored in the local memory of either the recipient's communication device 140 or the SMSC 120. Upon receipt of a message, either the processor of the recipient's communication device 140 or the SMSC 120 may retrieve any or all of the stored lists or tables in order to implement a variety of enhanced SMS, EMS, MMS services.

Figure 14:
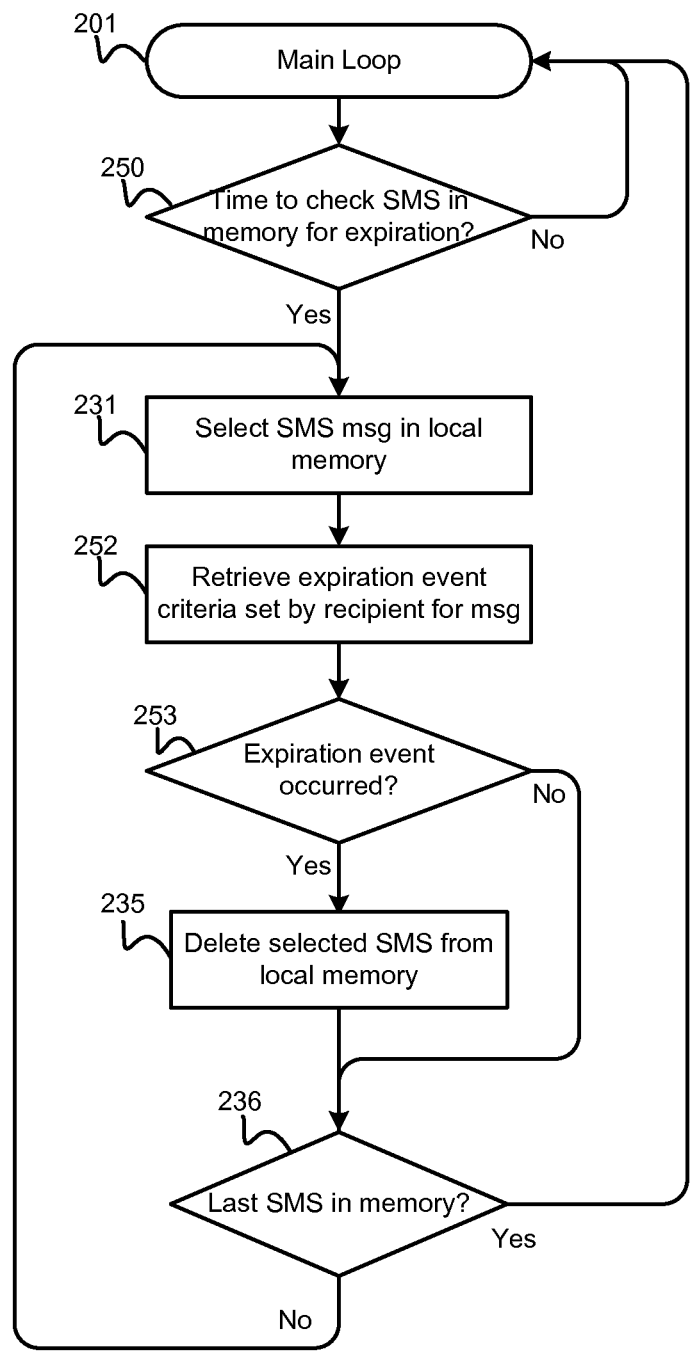
FIG. 14 is a process flow diagram illustrating steps of an embodiment method to delete a previously received SMS message upon an expiration event set by the recipient of the SMS message in the recipient's communication device.

In another embodiment, recipients may configure their communication devices to automatically delete SMS messages from local memory upon occurrence of an expiration event. FIG. 14 is a process flow diagram illustrating steps of another embodiment method providing recipients with the ability to automatically delete SMS messages upon the occurrence of an expiration event. In order to maintain their SMS message inbox, recipients may wish to automatically delete older SMS messages as they may no longer be relevant. For example, a recipient may be able to set a preference in their SMS application so that messages that have been received and stored in local memory for more than X minutes, hours, days, weeks, months, etc. may be automatically deleted from memory. Alternatively, a SMS message reminding the recipient to launch an application may no longer be relevant after the recipient has launched the application. Accordingly, upon the occurrence of an expiration event (in this case the launching of the application) the SMS reminder message may be automatically deleted from local memory. One of skill in the art would appreciate that other expiration events may be used as criteria to delete a SMS message from local memory automatically. In an embodiment, the recipient may set a preference such that an expiration event is applied to each SMS message that is received by the recipient's communication device 140. In an alternative embodiment, the recipient may apply a different (or none at all) expiration events to each SMS message as they are received. Thus, as the SMS messages are stored to local memory they may be collectively or individually appended with expiration event criteria. As the processor of the recipient's communication device 140 executes its main loop 201 routine it may periodically perform the process flow depicted in FIG. 14. If the time to check the SMS messages in memory for expiration has not elapsed yet (i.e., determination 250=No), then the processor may return to the main loop 201. Otherwise if the time to check the SMS messages in memory for expiration has elapsed (i.e., determination 250=Yes), then the processor selects a SMS message stored in memory in much the same manner as is described above with reference to FIG. 9, step 231. Once the processor has selected a SMS message, an appended expiration event criteria set by the recipient may be retrieved, step 252. The processor may examine the expiration event criteria to determine whether the expiration event has occurred or not, determination 253. If the appended expiration event for the selected SMS message has occurred (i.e., determination 253=Yes), then the selected SMS message may be deleted from local memory in the same manner as discussed above with reference to FIG. 9, step 235. Once deleted the processor of the recipient's communication device 140 may determine whether there is another SMS message is stored in memory to select or if the most recently selected SMS message was the sequentially last SMS message to check in memory, determination 236. However, if the appended expiration event criteria for the selected SMS message has not yet occurred (i.e., determination 253=No), then the processor of the recipient's communication device 140 may determine whether there is another SMS message stored in memory to select or if the most recently selected SMS message was the sequentially last SMS message to check in memory, determination 236, without deleting the SMS message. A SMS message whose expiration event has not yet occurred will remain in local memory. If the there are additional SMS messages to select in memory (i.e., determination 236=No), then the processor may sequentially select the next SMS message stored in memory to determine if the selected SMS message's expiration event has occurred, step 231. However, if the last SMS message in memory has been selected and checked (i.e., determination 236=Yes), then the processor may return to the main loop 201. One of skill in the art may appreciate that if no expiration event criteria has been appended to the SMS message, no expiration event criteria will be retrieved in step 252 and the processor may determine that the expiration event has not occurred, thus maintaining the SMS message in memory until the recipient manually deletes the message.

Figure 15:
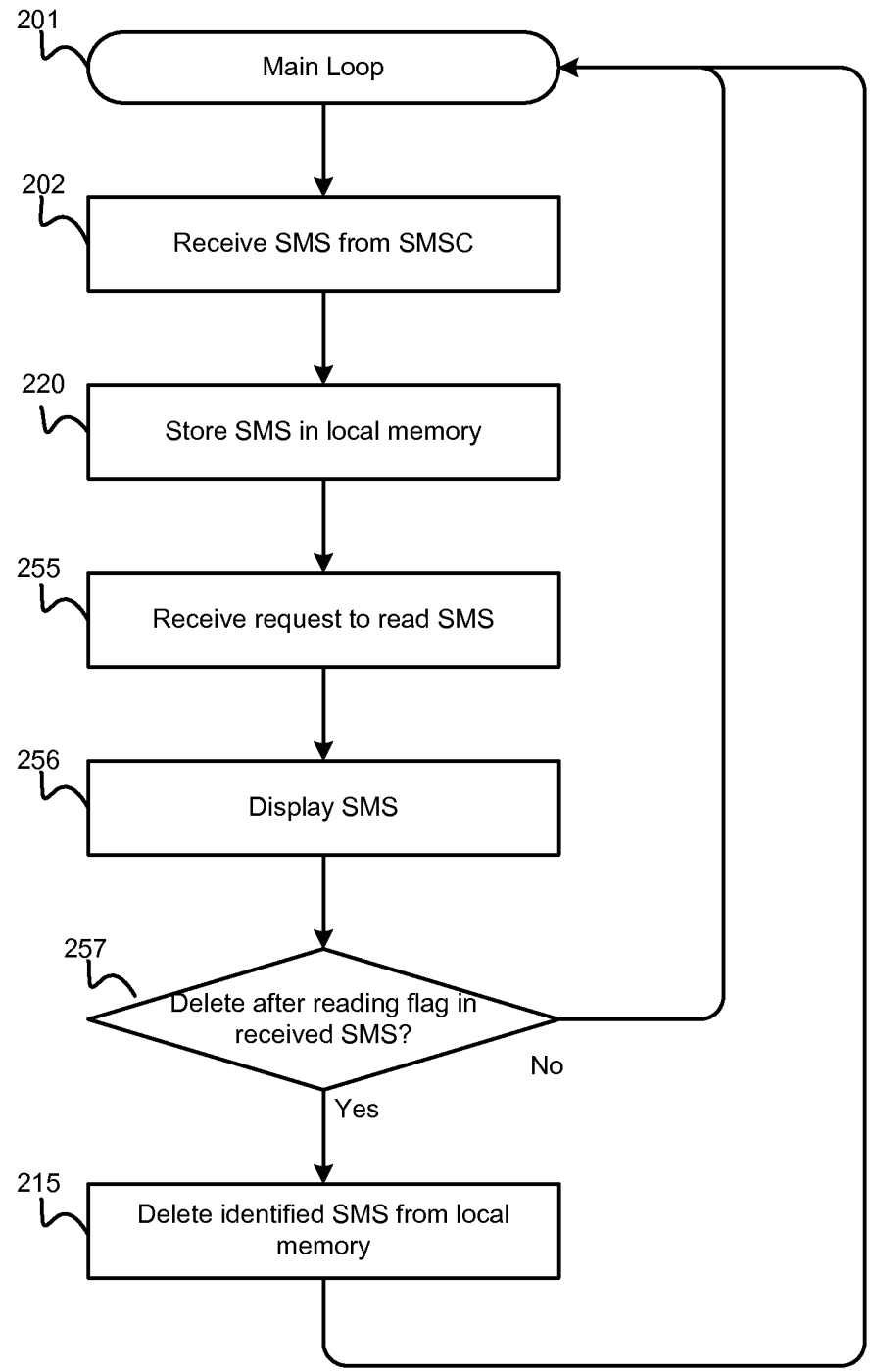
FIG. 15 is a process flow diagram illustrating steps of an embodiment method to delete a previously received SMS message once the SMS message has been displayed in the recipient's communication device.

In another embodiment, the sender may desire to send an SMS message that is automatically deleted after it is read or displayed by the recipient. FIG. 15 is a process flow diagram illustrating steps of another embodiment method to automatically delete a received SMS message after it is read/displayed. Since the SMS message is to be read/displayed by the recipient before deleting, the process flow may be performed by the recipient's communication device 140. During the operation of the main loop routine the processor of the recipient's communication device 140 may receive the SMS message containing the delete request from the SMSC 120, step 202. The processor of the recipient's communication device 140 may store the received SMS message in local memory for subsequent display to the recipient, step 220. After the SMS message is stored in local memory, a request to read/display the received SMS message, step 255. In accordance with the read/display request, the processor may display the message payload text on the display screen of the recipient's communication device 140, step 256. One of skill in the art may appreciate that a MMS message might include an audio file and may be read/displayed by playing the audio file over the speaker of the recipient communication device 140. Once the message is read/displayed, the processor may examine the message to determine whether a delete after reading flag has been set by the sender during the origination of the message, determination 257. If the delete after reading flag has not been set (i.e., determination 257=No), then the processor may return to the main loop routine, step 201. If the delete after reading flag has been set (i.e., determination 257=Yes), then the processor may delete the SMS message from local memory, step 215, and return to the main loop routine, step 201.

Figure 16:
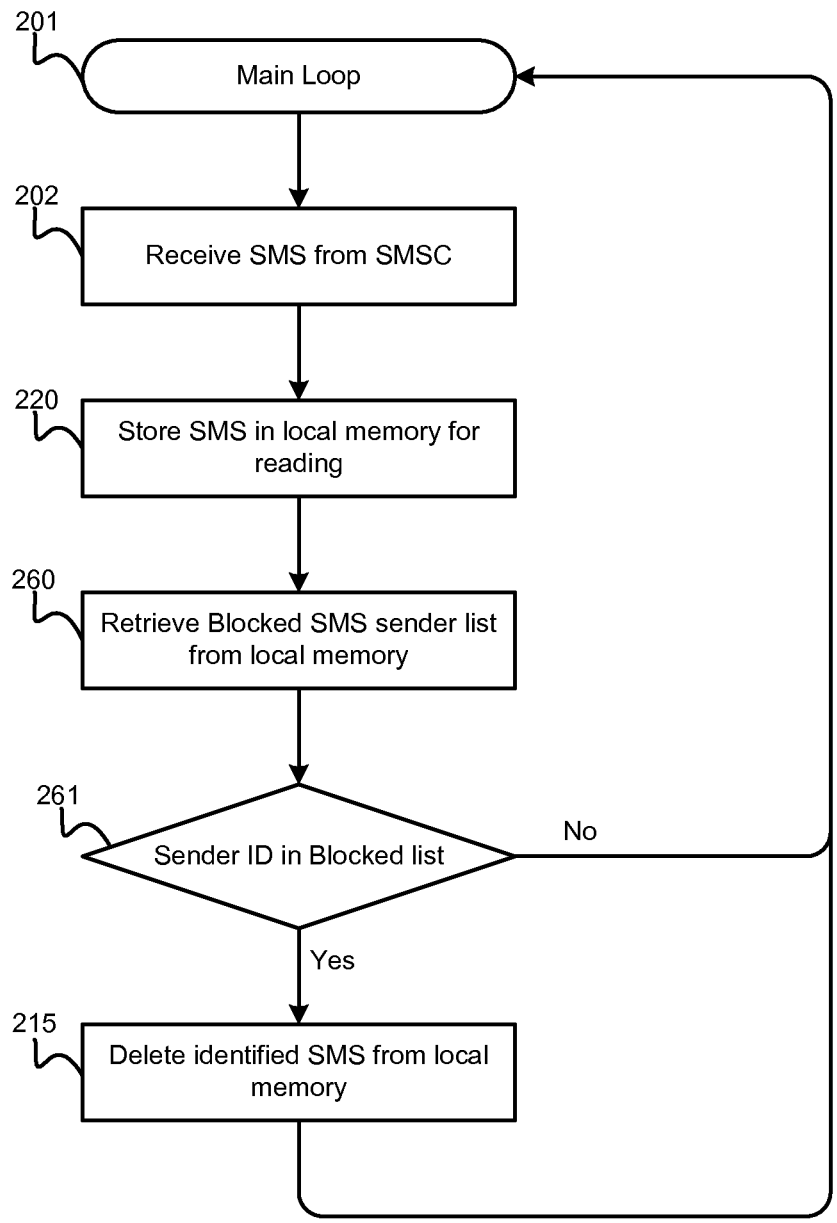
FIG. 16 is a process flow diagram illustrating steps of an embodiment method to block the receipt of SMS messages from selected sender communication devices by a recipient's communication device.
Figure 17:
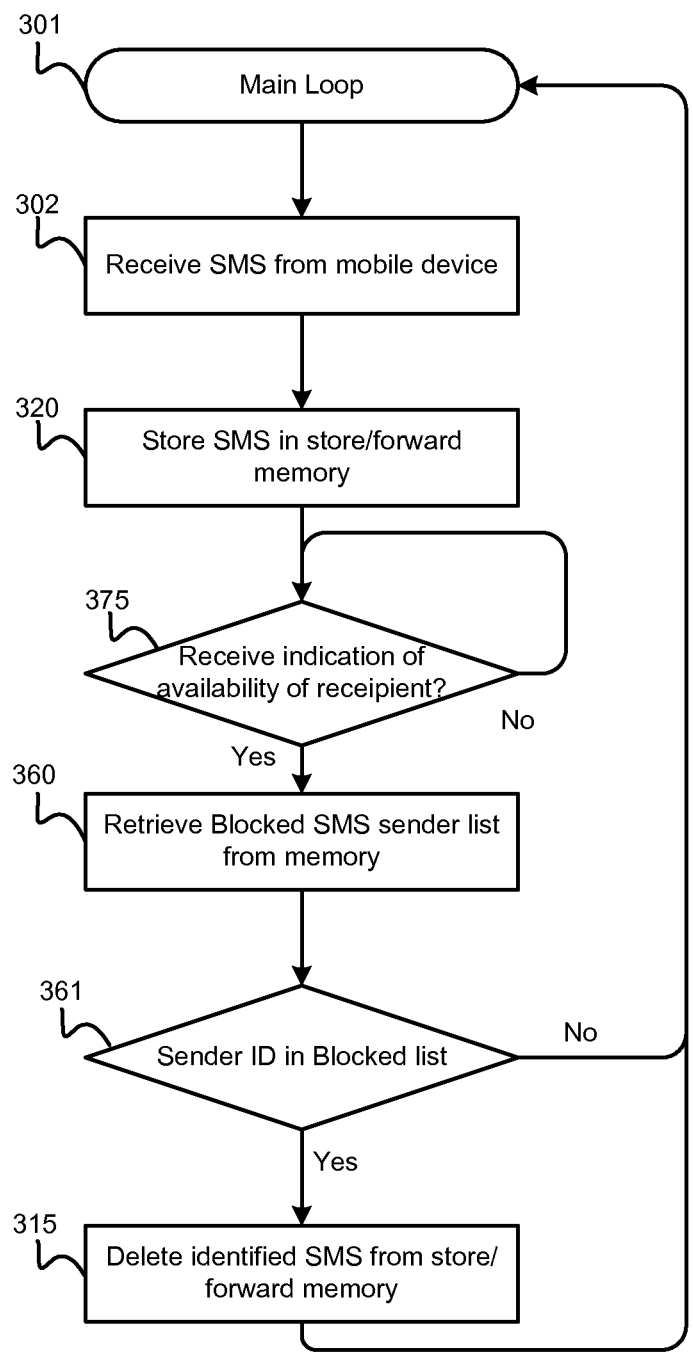
FIG. 17 is a process flow diagram illustrating steps of an embodiment method to block the forwarding of SMS messages from selected sender communication devices by a SMSC to a recipient's communication device.

In another embodiment, a recipient may wish to block SMS messages from selected senders. Conversely, in an alternative embodiment a recipient may wish to only allow receipt of SMS message from selected senders. For example, a parent may wish to regulate the senders from whom their children may receive SMS messages on the children's recipient communication device. As another example, a recipient may wish to prevent receipt of marketing SMS messages from a retailer. FIG. 16 is a process flow of an embodiment method that may be performed by a recipient's communication device 140 to allow/block receipt of SMS message from selected sender communication devices 110. The process flow depicted in FIGS. 16 and 17 illustrates steps that may be taken to block SMS messages from selected sender communication devices 110. One of skill in the art may appreciate that the same process flows may be used to allow receipt of SMS messages from only selected sender communication devices 110. In order to effectuate the process flow depicted in FIGS. 16 and 17, recipients may identify selected sender communication devices from which they wish to block SMS messages. The unique identifiers assigned to the selected sender communication devices may be saved in a blocked SMS sender list stored local memory of the recipient's communication device 140 and/or the SMSC 120.

Referring to FIG. 16, during the operation of the main loop routine the processor of the recipient's communication device 140 may receive the SMS message from the SMSC 120, step 202. The processor of the recipient's communication device 140 may store the received SMS message in local memory for subsequent display to the recipient, step 220. After the SMS message is stored in local memory, the processor of the recipient's communication device 140 may retrieve the blocked SMS sender list from memory, step 260. As above, the retrieved list may consist of potential sender communication devices 110 from which SMS messages may be blocked. Once the list is retrieved, the processor may retrieve a parameter value of the enhanced short message service message to compare with the parameter values contained in the retrieved list or table. In embodiments where the enhanced short message service is to block (or allow) short messages from selected sender communication devices 110, the retrieved parameter value may be the identifier of the sender communication device 110 contained in the received message header. The processor may compare the sender communication device 110 identifier contained in the header information of the received SMS message with each of the sender communication device 110 identifiers contained in the retrieved list. If the sender communication device 110 identifier contained in the header information of the received SMS message does not match any of the identifiers contained in the retrieved blocked SMS sender list (i.e., determination 261=No), then the processor may return to the main loop routine, step 201 and await a request to display the received SMS message. However, if the sender communication device 110 identifier contained in the header information of the received SMS message does match one of the identifier contained in the retrieved blocked SMS sender list (i.e., determination 261=Yes), then the processor may delete the SMS message from local memory, step 215. Once deleted, the processor may return to the main loop routine, step 201. In this manner, the recipient may be prevented from reading the SMS message from the blocked sender communication device.

FIG. 17 is a process flow diagram illustrating steps that may be performed by the SMSC 120 to block the receipt of SMS message by a recipient's communication device 140 from select sender communication devices 110. The process flow illustrated in FIG. 17 is similar to the process flow illustrated in FIG. 16. Steps 301, 302, 320, 360, 361, and 315 of FIG. 17 correspond to steps 201, 202, 220, 260, 261, and 215 of FIG. 16, respectively. After storing the received message in local memory, the processor of the SMSC 120 may await an indication that the recipient's communication device 140 is available (i.e., registered with a communication network), step 375. If the recipient's communication device 140 is not available (i.e., determination 375=No), then the processor of the SMSC 120 may continue to await the indication of availability, determination 375. If the indication of availability of the recipient's communication device 140 is received (i.e., determination 375=Yes), then the processor of the SMSC 120 may continue to perform steps 360, 361, and 315. Since the SMSC 120 may support SMS messaging for a plurality of communication devices, the SMSC 120 may store a plurality of blocked SMS sender lists. Each of the plurality of blocked SMS sender lists may correspond to one of the recipient communication devices 140 supported by the SMSC 120. In order to retrieve the appropriate SMS blocked sender list, the SMSC 120 may examine the received SMS message to retrieve the recipient communication device 140 identifier from the received SMS message header. Based upon this information, the SMSC 120 may retrieve the appropriate SMS blocked sender list for the intended recipient. In this manner, the SMSC 120 may prevent SMS message originating from select sender communication devices 110 from ever being forwarded to the recipient communication device 140.

Figure 18:
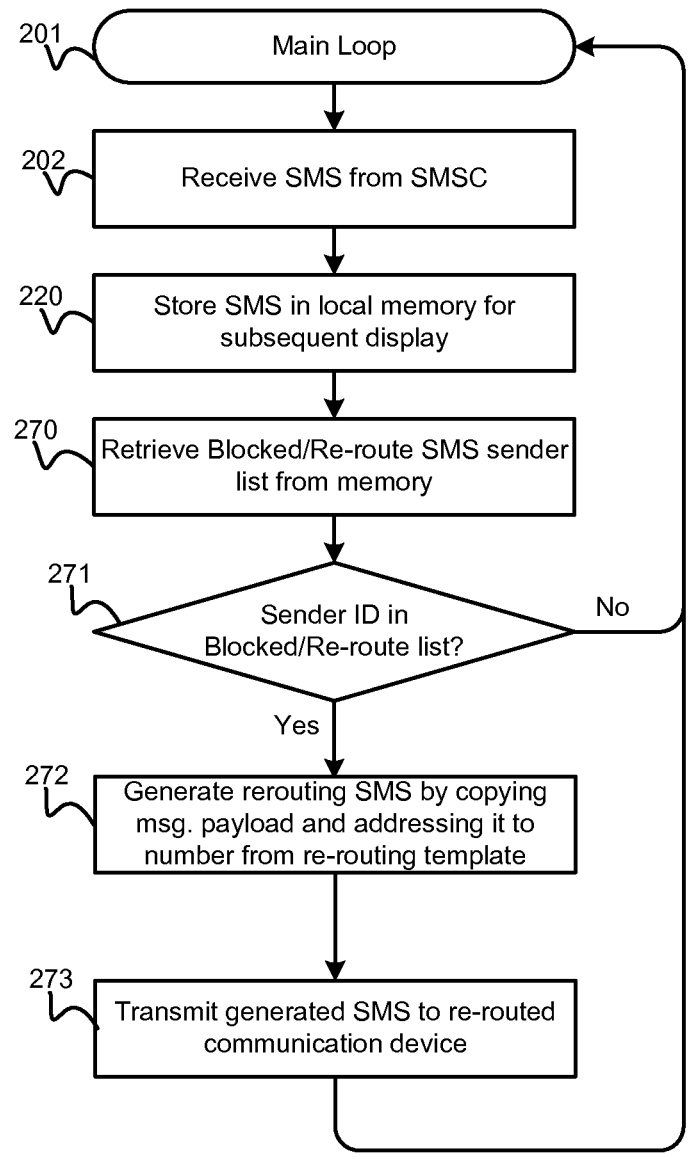
FIG. 18 is a process flow diagram illustrating steps of an embodiment method to re-route SMS messages from selected sender communication devices to a re-routed recipient's communication device.

In another embodiment, a SMS message may be re-routed to a communication device different from the communication device that is inputted as the address by the sender. For example, parents may provide their children with portable communication devices for use in emergency situations. In order to prevent their children from receiving improper or explicit SMS message, parents may wish to re-route SMS message addressed by a sender to their child's communication device to the parents' communication device. FIG. 18 is a process flow of an embodiment method that may be performed by a recipient's communication device 140 to re-route a SMS message from select sender communication devices 110 to a different recipient communication device. The process flow of the embodiment illustrated in FIG. 18 is similar to the process flow illustrated and described above with reference to FIG. 16. As above, the recipient's communication device that is originally addressed as the recipient of the SMS message by the sender receives a SMS message from the SMSC 120 (step 202) and stores the SMS message in local memory for subsequent display (step 220). After the SMS message is stored in local memory, the processor of the recipient's communication device 140 may retrieve a re-routing list of potential sender communication devices 110 from memory, step 270. The retrieved re-routing list may consist of potential sender communication devices 110 from which SMS messages may be re-routed. The retrieved re-routing list may also contain the address of the different recipient communication device to which the received SMS message from select sender communication device should be re-routed. The re-routing list may assign a singular recipient communication device to receive the re-routed SMS message or a different recipient communication device to receive the re-routed SMS message depending upon the sender communication device that originally sent the re-routed SMS message. An exemplary re-routing list is illustrated in FIG. 20. Once the list is retrieved, the processor may compare the sender communication device 110 identifier contained in the header information of the received SMS message with each of the sender communication device 110 identifiers contained in the retrieved list, determination 271. If the sender communication device 110 identifier contained in the header information of the received SMS message does not match any of the identifier contained in the retrieved list (i.e., determination 271=No), then the processor may return to the main loop routine, step 201 and await a request to display the received SMS message. However, if the sender communication device 110 identifier contained in the header information of the received SMS message does match one of the identifier contained in the retrieved list (i.e., determination 271=Yes), then the processor may generate a re-routed SMS message by copying the message payload into a new SMS message and addressing the new SMS message with the address of re-routed recipient communication device listed in the retrieved re-routing list, step 272. As mentioned above, the address of the re-routed recipient communication device may be the same for all re-routed SMS message or different depending upon the identifier of the sender communication device that originally sent the SMS message. Once generated, the recipient's communication device 140 transmits the newly generated SMS message to the re-routed recipient communication device, step 273. Once the newly generated SMS message is transmitted, the processor of the recipient's communication device 140 may return to the main loop, step 201.

Figure 19:
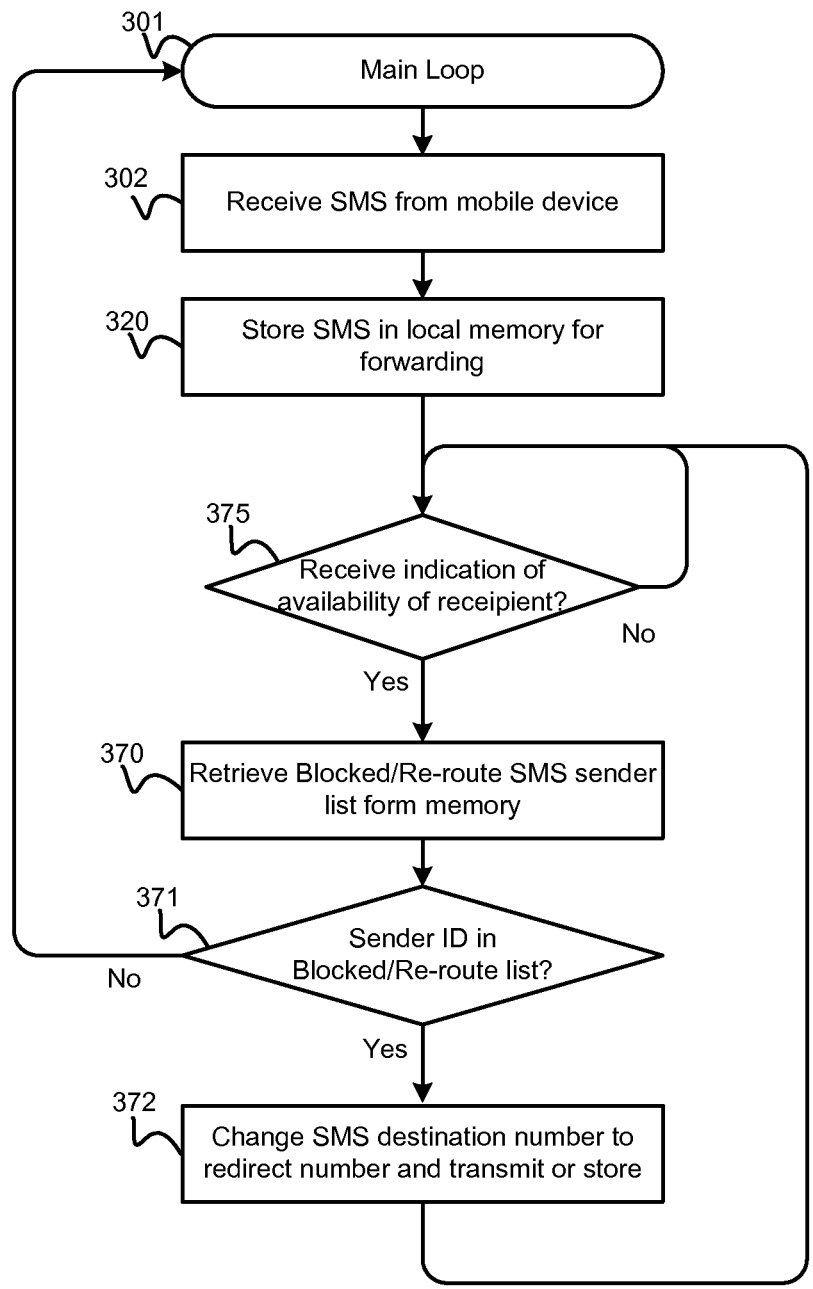
FIG. 19 is a process flow diagram illustrating steps of an embodiment method to re-route the forwarding of SMS messages from selected sender communication devices to a re-routed recipient's communication device by a SMSC.

FIG. 19 is a process flow diagram illustrating steps that may be performed by the SMSC 120 to re-route a SMS message address to a recipient's communication device 140 from select sender communication devices 110. The process flow illustrated in FIG. 19 is similar to the process flow illustrated in FIG. 18. Steps 301, 302, 320, 370, 371, and 372 of FIG. 19 correspond to steps 201, 202, 220, 270, 271, and 272 of FIG. 18, respectively. After storing the received message in local memory, the processor of the SMSC 120 may await an indication that the recipient's communication device 140 is available (i.e., registered with a communication network), step 375. If the recipient's communication device 140 is not available (i.e., determination 375=No), then the processor of the SMSC 120 may continue to await the indication of availability, determination 375. If the indication of availability of the recipient's communication device 140 is received (i.e., determination 375=Yes), then the processor of the SMSC 120 may continue to perform steps 370, 371, and 372. Since the SMSC 120 may support SMS messaging for a plurality of communication devices, the SMSC 120 may store a plurality of re-routing SMS sender lists. Each of the plurality of re-routing SMS sender lists may correspond to one of the recipient communication devices 140 supported by the SMSC 120. In order to retrieve the appropriate SMS blocked sender list, the SMSC 120 may examine the received SMS message to retrieve the recipient communication device 140 identifier from the received SMS message header. Based upon this information, the SMSC 120 may retrieve the appropriate re-routing SMS sender list for the intended recipient. In addition, because the SMSC 120 stores the received SMS messages until it receives an indication that the intended recipient's communication device 140 is available (i.e., registered with a communication network), in step 372 the SMSC 120 may simply change the address of the re-routed SMS message to that of the re-routing recipient's communication device in accordance with the re-routing list retrieved in step 370. Once the destination address of the re-routed SMS message is changed to the re-routing recipient's communication device, the SMSC 120 may simply continue to store the SMS message in a conventional manner and await an indication that the re-routed recipient communication device has become available, step 375. In this manner, the SMSC 120 may re-route an SMS message originating from select sender communication devices 110 to a re-routing recipient's communication device.

FIG. 20 is an exemplary re-routing list that may be stored in memory by a recipient's communication device and/or the SMSC 120. As shown in FIG. 20 a list of potential sender communication device 110 identifiers may be contained in the re-routing list. The potential communication device 110 identifiers may be a phone number assigned to the communication device 110, but may also be any other identifier that is contained with the header of a SMS message that is used to identify the sender's communication device 110 (source) that sent the SMS message. As shown in the example re-routing list illustrated in FIG. 20, SMS messages addressed to the recipient's communication device 140 that stores the re-routing list (or the recipient's communication device 140 for which the re-routing list is being stored in the SMSC 120) and sent from a sender's communication device 110 having an identifier of 202-555-1212, 202-555-1313, 202-555-1414, or 202-555-1515 will be re-routed. The example re-routing list illustrated in FIG. 20 also shows the address for the re-routing recipient's communication device that a SMS message may be re-routed to. For example, if a SMS message is received by the recipient's communication device 140 from a sender's communication device 110 assigned with the phone number 202-555-1212, the SMS message may be re-routed to a recipient's communication device assigned with the phone number 303-999-1111.

In some communication devices an audible alert, visual alert, vibration alert or combination of some or all of these alerts may be made when the communication device receives a short message. Such alerts may be distracting to a recipient in some situations (e.g., while at work, in a place of worship, at school, etc.). Accordingly, users may wish to set their mobile device to prevent the receipt of short messages at certain times and/or locations. In addition, as discussed above with reference to FIGS. 16-20, parents may provide their children with a mobile device for use in emergency situations. As it happens, teenagers are the most likely demographic group to utilize the short messaging service application on mobile devices. In order to limit the number of short messages sent and received by their children's mobile devices and to prevent distractions while their children are in school, parent may wish to regulate where and/or when their children's mobile device may send or receive a short message. In contrast to the embodiments described above with reference to FIGS. 11 and 12, the prevention of receiving/forwarding short messages by/to the recipient's communication device 140 while the recipient's communication device 140 is in certain locations and/or at certain times is set by the recipient (or recipient's parent, proxy, etc.).

As with the embodiment methods discussed above with reference to FIGS. 16-20, prior to implementation of the embodiment method a recipient (or recipient's parent, proxy, etc.) may initialize the embodiment method by creating a table of restricted locations and/or times at which the recipient (or recipient's parent, proxy, etc.) wishes to prevent the receipt of short messages. An exemplary table of restricted locations and/or times is shown in FIG. 24 and discussed in more detail below. Once the table of restricted locations and/or times is generated, it may be stored in local memory of either the recipient's communication device or the SMSC 120 or both.

Figure 21:
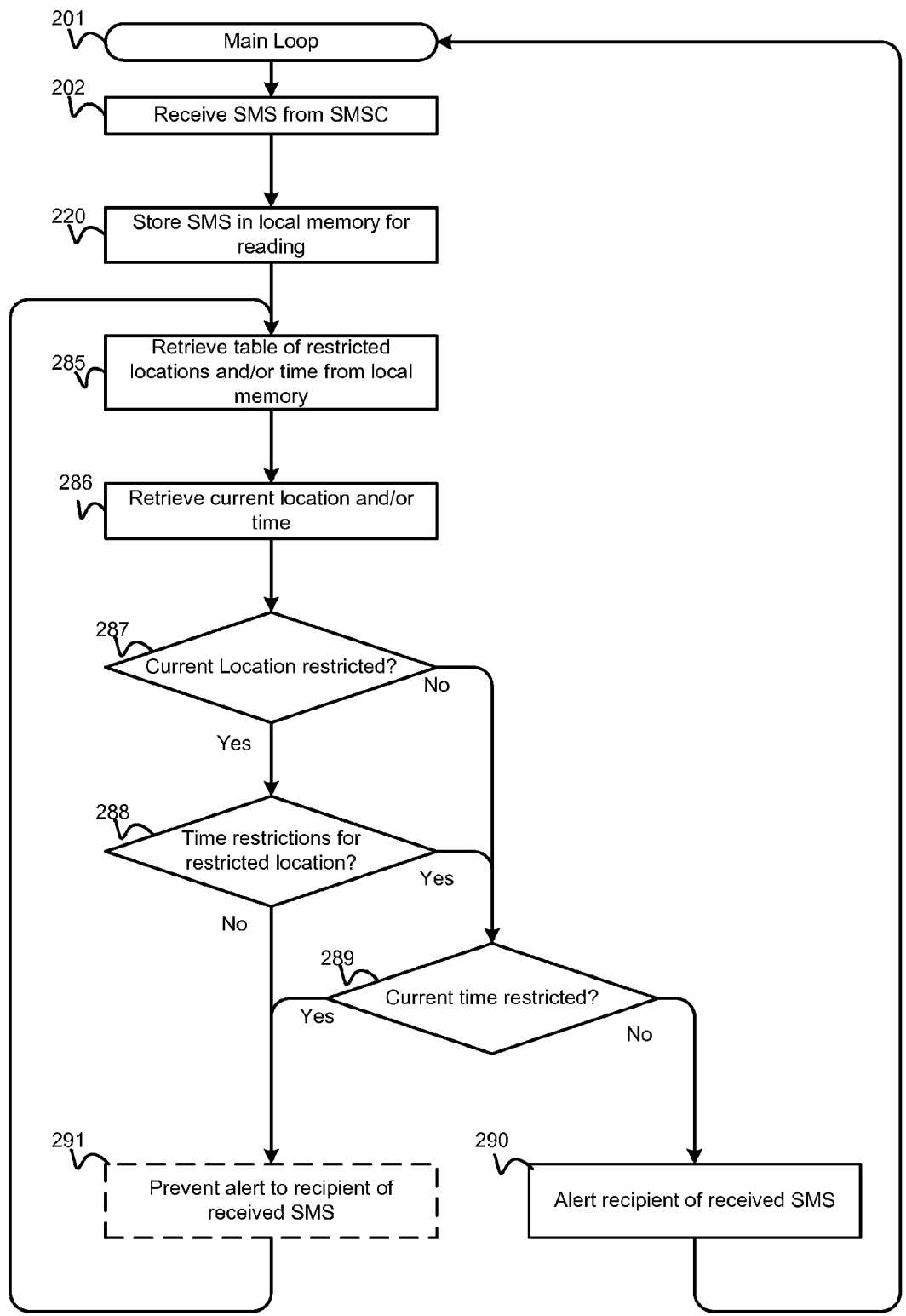
FIG. 21 is a process flow diagram illustrating steps that may be taken by an embodiment method in the recipient's communication device to prevent the receipt of short messages by the communication device at certain times and/or locations.

FIG. 21 is a process flow diagram illustrating an embodiment method that may be implemented in the recipient's communication device 140 to prevent the receipt of short messages at certain times and/or locations. Similar to the embodiments described above, during the execution of the main loop routine 201, the processor of the recipient's communication device 140 may receive a message from the SMSC 120, step 202, and store it in local memory, step 220. When the received message is stored in local memory, the processor of the recipient's communication device 104 may retrieve a previously stored restrictions table of restricted locations and/or times, step 285. If the recipient (or recipient's parent, proxy, etc.) has elected to restrict the receipt of short messages based upon location, the processor may retrieve the current location (e.g., from a GPS receiver) and/or current time (e.g., from a current time memory buffer), step 286. As above, any of a number of methods may be used to obtain the current location of the recipient's communication device. For example, the processor may interrogate a GPS unit within the recipient's communication device 140. Alternatively, the processor may take note of the base station with which the communication device is currently registered and correlate the base station identity with a general indication of current location. Once the current location is determined, the processor may determine whether the current location matches a restricted location listed in the retrieved restrictions table of restricted locations and/or times, determination 287. If the current location matches a restricted location listed in the retrieved restrictions table (i.e., determination 287=Yes), then the processor may determine whether there is a corresponding time restriction for the restricted location listed in the retrieved restrictions table, determination 288. If there is no corresponding time restriction listed for the restricted location in the retrieved restrictions table (i.e., determination 288=No), this indicates the recipient (or recipient's parent, proxy, etc.) desires to prevent receipt of short messages whenever the recipient's communication device is in the current location regardless of the time. Accordingly, as an optional step, the processor of the recipient's communication device 140 may prevent sounding a message received alert or displaying a message received indication display, step 291, and return to the steps of comparing the current location to parameter values in the restrictions table, steps 285-287. One of skill in the art may appreciate that a time delay may be inserted so that some predetermined period of time elapses before the processor repeats the process steps 285-291 to determine if the recipient should be alerted of the received short message. Such a delay may conserve battery power by minimizing processing steps.

If the current location does not match any of the restricted locations listed in the retrieved restrictions table (i.e., determination 287=No), then the processor may determine whether there is a time restriction listed in the retrieved restrictions table, determination 289. For example, the recipient (or recipient's parent, proxy, etc.) may desire to prevent receipt of short messages during certain times of the day, certain days of the week, certain months, etc., or even some combination of times, days, weeks, months, etc. regardless of location. If the current time matches any of the restricted times listed in the retrieved restrictions table (i.e., determination 289=Yes), then as an optional step, the processor of the recipient's communication device 140 may prevent sounding a message received alert or displaying a message received indication display, step 291, and return to the steps of comparing the current location to parameter values in the restrictions table, steps 285-287. As mentioned above, one of skill in the art may appreciate that a time delay may be inserted so that some predetermined period of time elapses before the processor repeats the process steps 285-291 to determine if the recipient should be alerted of the received short message.

If the current time does not match any of the restricted times listed in the retrieved restrictions table (i.e., determination 289=No), then the processor may alert the recipient of the received short message, step 290. After alerting the recipient of the received short message, the processor may return to the main loop routine, step 201.

If after determining that the current location is a restricted location (i.e., determination 287=Yes) and that there is a corresponding time restriction for the restricted location (i.e., determination 288=Yes), the processor may determine whether the current time matches any of the restricted times listed in the retrieved restrictions table, determination 289. As described above, if the current time matches any of the restricted times listed in the retrieved restrictions table (i.e., determination 289=Yes), then the processor may prevent sounding a message received alert or displaying a message received indication display, step 291, and return to the steps of comparing the current location to parameter values in the restrictions table, steps 285-287. Otherwise (i.e., determination 289=no), the processor may alert the recipient of the received message, step 290, even though the recipient's communication device is located in a restricted location.

Figure 25:
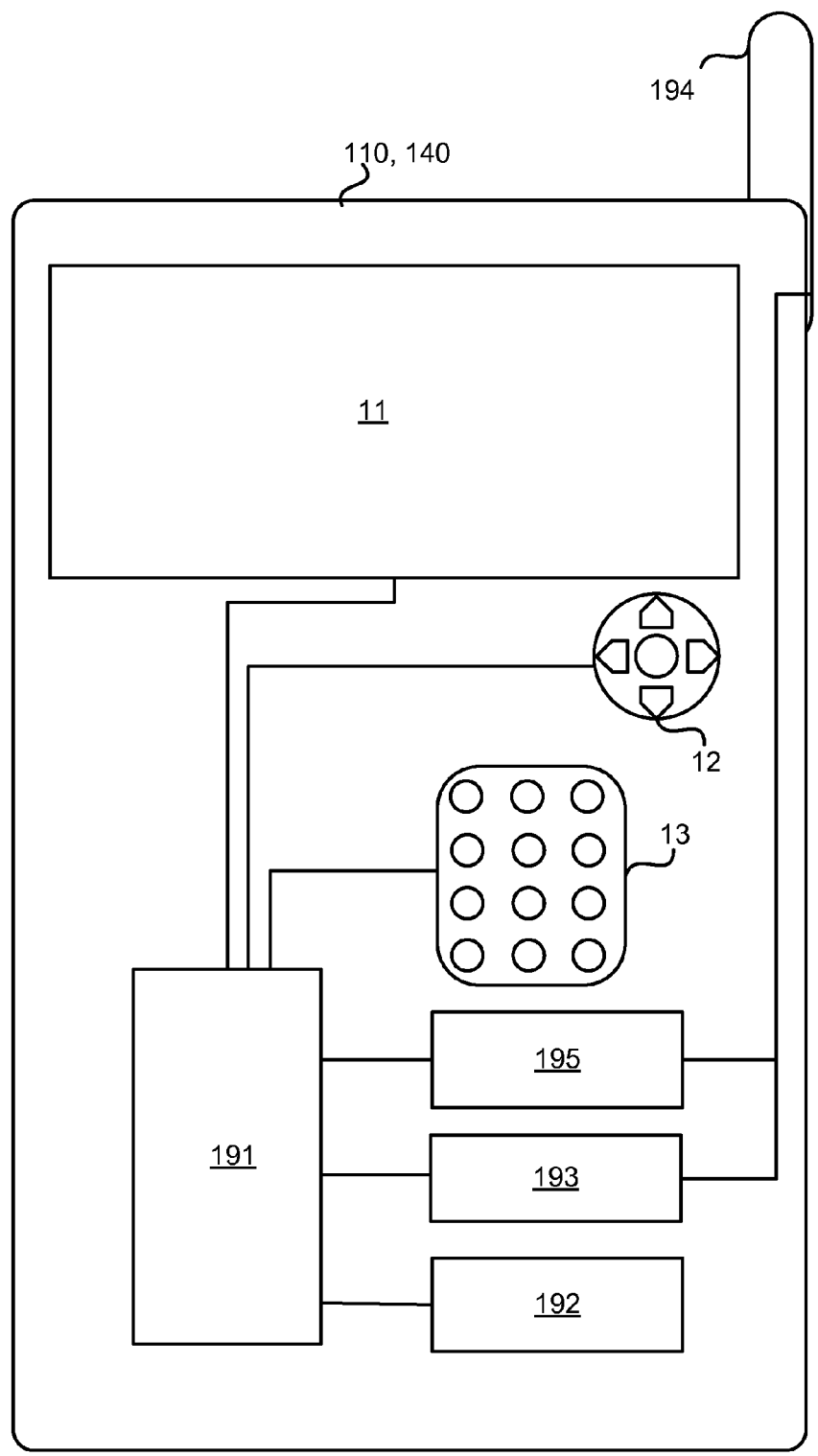
FIG. 25 a system block diagram of a communication device suitable for use with the various embodiments.

In another embodiment, the SMSC 120 may avoid transmitting a short message to a recipient's communication device while the recipient's communication device 140 is in certain locations and/or at certain times. In such an embodiment, the SMSC 120 may not forward a short message to the recipient's communication device 140 if the recipient's communication device 140 is in a location and/or the current time satisfies restrictions in a restrictions table stored in memory of the SMSC 120. As with the embodiment described above with reference to FIG. 21, the recipient (or recipient's parent, proxy, etc.) may create a restrictions table of restricted locations and/or times at which the recipient (or recipient's parent, proxy, etc.) wishes to prevent the receipt of short messages. An exemplary restrictions table is shown in FIG. 25 and discussed in more detail below. Once the restrictions table is generated, it may be transmitted to the SMSC 120 for storage in local memory of the SMSC 120 or some memory that may be accessed by the SMSC 120 for retrieval.

Figure 22:
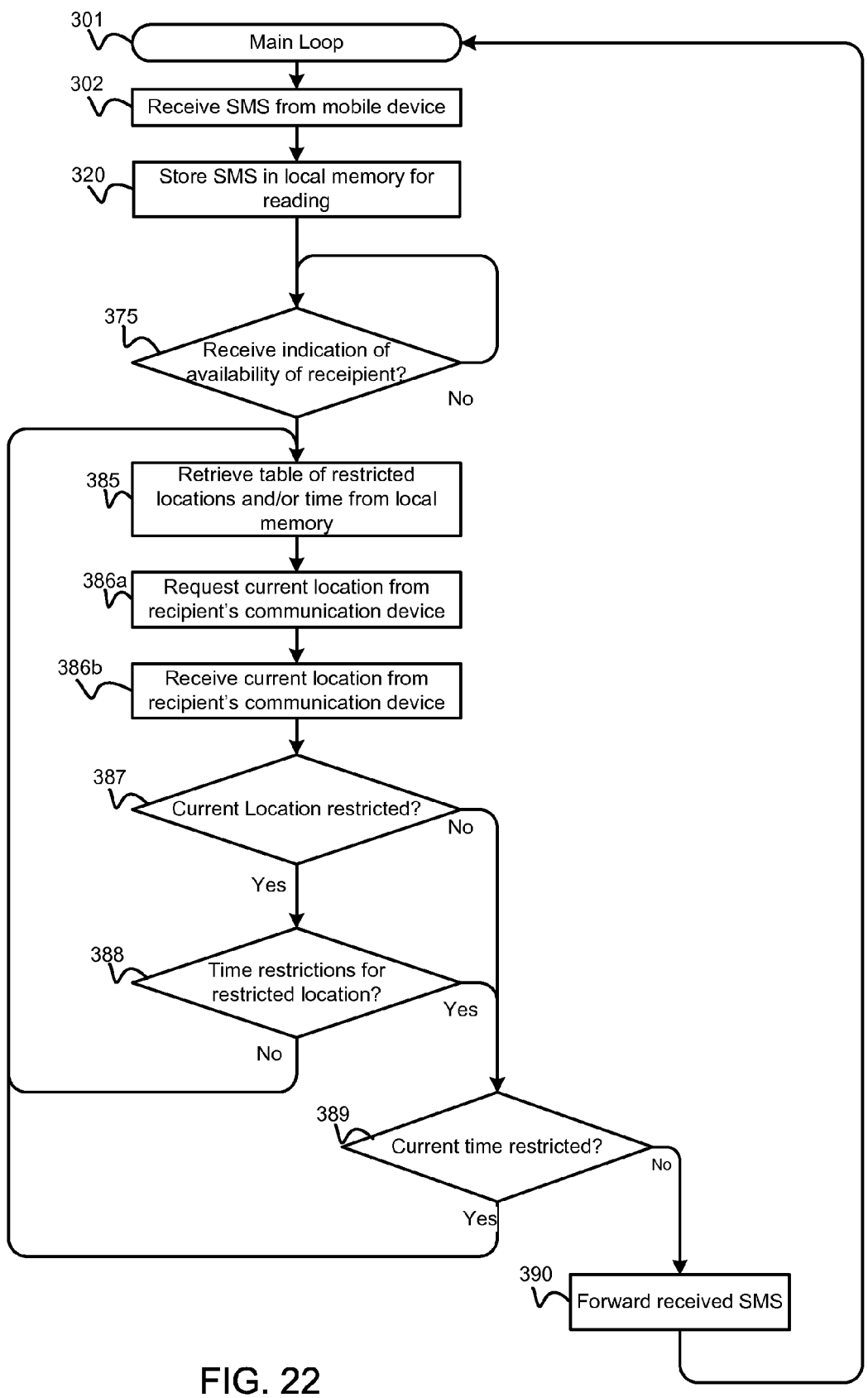
FIG. 22 is a process flow diagram illustrating the steps that may be taken by a SMSC in an embodiment method to prevent the forwarding of short messages to a recipient's communication device when the recipient's communication device is located in certain locations and/or at certain times.

FIG. 22 is a process flow diagram illustrating the steps of an embodiment method that may be implemented in a SMSC 120 to prevent the forwarding of short messages to a recipient's communication device 140 when the recipient's communication device 140 is located in certain locations and/or at certain times. The process flow illustrated in FIG. 22 is similar to the process flow illustrated in FIG. 21. Steps 301-320 are described above in a number of other embodiments. After storing the received message in local memory, the processor of the SMSC 120 may await an indication that the recipient's communication device 140 is available (i.e., registered with a communication network), step 375. If the recipient's communication device 140 is not available (i.e., determination 375=No), then the processor of the SMSC 120 may continue to await the indication of availability, determination 375. If the indication of availability of the recipient's communication device 140 is received (i.e., determination 375=Yes), then the processor of the SMSC 120 may perform steps 385-390 in much the same manner as discussed above with reference to FIG. 21 and steps 285-290. However, in order to retrieve the current location of the recipient's communication device 140 (step 285), the processor of the SMSC 120 may send a request to the recipient's communication device 140 to report its current location, step 386b, and receive the current location of the recipient's communication device 140, step 386b. Once the current location is determined, the processor may determine whether the current location matches a restricted location listed in the retrieved restrictions table of restricted locations and/or times, determination 387. If the current location matches a restricted location listed in the retrieved restrictions table (i.e., determination 387=Yes), then the processor may determine whether there is a corresponding time restriction for the restricted location listed in the retrieved restrictions table, determination 388. If there is no corresponding time restriction listed for the restricted location in the retrieved restrictions table (i.e., determination 388=No), this indicates the recipient (or recipient's parent, proxy, etc.) desires to prevent the forwarding of short messages to the recipient's communication device 140 whenever the recipient's communication device is in the current location regardless of the time. The processor may then return to the steps of comparing the current location to parameter values in the restrictions table, steps 385-387. One of skill in the art may appreciate that a time delay may be inserted so that some predetermined period of time elapses before the processor repeats the process steps 385-390 to determine if the received short message should be forwarded to the recipient. Such a delay may conserve processing power by minimizing processing steps.

If the current location does not match any of the restricted locations listed in the retrieved restrictions table (i.e., determination 387=No), then the processor may determine whether there is a time restriction listed in the retrieved restrictions table, determination 389. For example, the recipient (or recipient's parent, proxy, etc.) may desire to prevent the forwarding of short messages to the recipient's communication device 140 during certain times of the day, certain days of the week, certain months, etc., or even some combination of times, days, weeks, months, etc. regardless of location. If the current time matches any of the restricted times listed in the retrieved restrictions table (i.e., determination 389=Yes), then the processor may return to the steps of comparing the current location to parameter values in the restrictions table, steps 385-387 without forwarding the short message to the recipient's communication device 140.

If the current time does not match any of the restricted times listed in the retrieved restrictions table (i.e., determination 389=No), then the processor may forward the received message to the recipient's communication device 140, step 390. After forwarding the received message, the processor may return to the main loop routine, step 301.

If after determining that the current location is a restricted location (i.e., determination 387=Yes) and that there is a corresponding time restriction for the restricted location (i.e., determination 388=Yes), the processor may determine whether the current time matches any of the restricted times listed in the retrieved restrictions table, determination 389. As described above, if the current time matches any of the restricted times listed in the retrieved restrictions table (i.e., determination 389=Yes), then the processor returns to the steps of comparing the current location to parameter values in the restrictions table, steps 385-387 without forwarding the received message to the recipient's communication device 140. Otherwise (i.e., determination 389=no), the processor may forward the received message to the recipient's communication device 140, step 390, even though the recipient's communication device is located in a restricted location.

Figure 23:
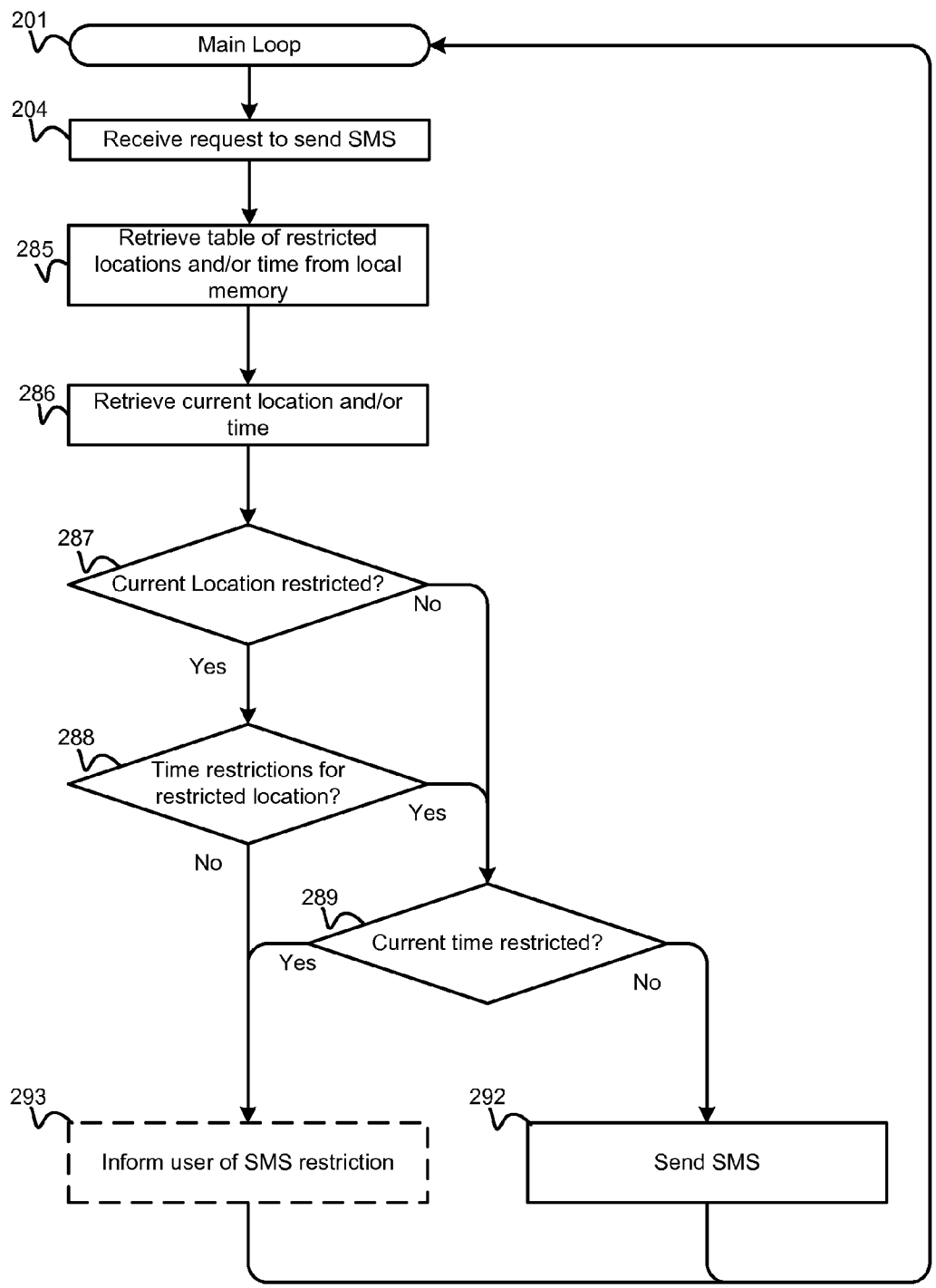
FIG. 23 is a process flow diagram illustrating steps that may be taken by the recipient's communication device to prevent the sending of short messages while the communication device is located in a certain location and/or at certain times.

Some parents may wish to prevent their children from not only receiving short messages at certain location and/or times, but also from sending short messages at certain location and/or times. For example, parents may wish to restrict their children's ability to send short messages while at school and/or during school hours. FIG. 23 is a process flow diagram illustrating an embodiment by which the sender's communication device 140 may prevent the sending of short messages while the communication device 140 is located in a certain location and/or at certain times. The process flow illustrated in FIG. 23 is similar to the process flow illustrated in FIG. 21 except that the method blocks the sending of messages, not alerting the user to received messages. In the process flow illustrated in FIG. 23 during execution of the main loop routine 201, the processor of the communication device 140 may receive a request to send a short message, step 204. This request may be in the form a user attempting to launch a messaging application or pressing the "send" key after the recipient address information and payload text has been inputted or may be a request to launch the short messaging application. When the processor of the recipient's communication device 140 receives an indication of an attempt to send a simple message it may perform steps 285-289 as described above with reference to FIG. 21. However, if the processor determines that the current time is not restricted (i.e., determination 289=No), then the processor may allow the user to send the short message, step 292, such as by executing the normal simple messaging processes (not shown) before returning to the main loop routine 201. If the current location is restricted and/or the current time is restricted (i.e., determination 287=Yes and/or determination 289=Yes), then the processor of the recipient's communication device may optionally inform the user of the short messaging restrictions imposed on the recipient's communication device 140 before returning to the main loop.

FIG. 24 is an exemplary restrictions table including restricted locations and/or times that may be stored in memory by a recipient's communication device and/or the SMSC 120. As shown in FIG. 24 a list of potential locations and times may be contained in the restrictions table. The restricted locations may be identified by categories or labels that may correspond to specific locations. Alternatively, the restricted locations may be identified by GPS coordinates or nearby base stations operating within a service provider's communication network. GPS coordinates may provide a finer level of granularity and precision as to the restricted locations. However, in some applications a more general determination of location, such as may be provided by knowing the base station to which a communication device 140 would be registered, may be preferable. In addition, the exemplary table lists various restricted times.

As described above with reference to FIGS. 21-23, a processor may compare the current location of the recipient's communication device with the locations listed in the restrictions table. As an example, if the recipient's communication device 140 current location matched one of "School," "Work," or "House of Worship," the sending or receipt of short message may be restricted. If the recipient's communication device 140 is located at "School" during the hours of 8 am to 4 pm Monday through Friday, the sending or receipt of short messages may be restricted. In contrast, if the current location of the recipient's communication device 140 is "Work" the sending or receipt of short messages may be restricted regardless of day or time. Similarly, a recipient may wish to prevent the sending or receipt of short message regardless of location during lunch hours. Accordingly, the exemplary restrictions table lists the time period of 12 pm to 1 pm as a restricted time regardless of location.

While the process flow illustrated in FIGS. 21-23 depicts embodiments in which the recipient (or recipient's parent, proxy, etc.) has elected to restrict the receipt and/or forwarding of short messages based upon location and/or time, one of skill in the art may appreciate that the receipt of short messages may be restricted to a single criteria (i.e., location or time). In such embodiments, either determination 287 or determination 286 as well as determination 288 may be omitted. For example, referring to FIG. 21, if the recipient elects to restrict receipt of short messages based upon location only, if the current location is a restricted location (i.e., determination 287=Yes), then the processor may directly return to step 285. However, if the current location is not a restricted location (i.e., determination 287=No), then the processor may alert the user of the received SMS message, step 290, without determining if the current time is restricted. Such a process flow may be similar to the process flow illustrated in FIG. 11, where the receipt of the short message is prevented, albeit by the sender, if the recipient's communication device 140 is located in a certain location. One of skill in the art may appreciate that the process flow depicted in FIGS. 11 and 12 may be modified to add comparisons of current time to time restrictions in a manner similar to FIGS. 21 and 22 (i.e., including determinations 288, 289, 388 and 389) to prevent the display of a short message if the recipient's communication device 140 is located in a certain location and/or at certain times selected by the sender.

In instances where the restriction is based on time alone, determination 289 may be substituted for determination 287 in FIGS. 21-23. In addition, one of skill in the art may appreciate that in instances where the recipient (or recipient's parent, proxy, etc.) has elected to restrict the receipt of short messages based upon location and/or time, determinations 287 and 289 may be performed in a different order and the processes interchangeably swapped so that the processor determines whether the current time is restricted before determining if the current location is restricted. In such an embodiment, determination 288 would determine if there is a location restriction corresponding to the restricted time.

In addition, since the restrictions table may be set by a recipient's parent (or proxy, etc.), access to the restrictions table to modify, add or delete may be limited to an authorized person. For example, entry of a security code may be required before modifications to the table may be permitted. Such security measures may prevent a user from overriding the parental locks and limitation settings. Such security measures may also be implemented with any of the embodiments described herein.

As with the embodiments discussed above with reference to FIGS. 16-20, one of skill in the art may appreciate that the embodiments described with reference to FIGS. 21-25 may be modified to only allow the receipt and/or forwarding of short message to/from a recipient's communication device 140 if the recipient's communication device 140 is located at certain location and or at certain times.

One of skill in the art may appreciate that a singular recipient communication device 140 as well as a singular SMSC 120 may perform a variety of the disclosed embodiment methods. Each of the disclosed embodiments may be performed as a nested loop within the main loop routine 201 and 301. Thus, any combination of embodiment methods may be performed from the main loop routines 201 and 301.

The embodiments described above may be implemented on any of a variety of communication devices, such as, for example, cellular telephones, personal data assistants (PDA) with cellular telephone and/or WIFI transceivers, mobile electronic mail receivers, mobile web access devices, laptop computers, palmtop computers and other processor-equipped devices. In addition, the various embodiments disclosed herein may be implemented by any processor-equipped device including stationary desktop computers. Typically, such portable computing devices will have in common the components illustrated in FIG. 25. For example, the communication device 110 or 140 may include a processor 191 coupled to internal memory 192 and a display 11. Additionally, the communication device 110, 140 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications is referred to as the air interface since it provides a data interface via a wireless data link. Communication devices 10 also typically include a key pad 13 or miniature keyboard and menu selection buttons or rocker switches 12 for receiving user inputs. The processor 191 may further be connected to a vocoder 199 which is in turn connected to a microphone 19 and speaker 18. The communication device may also include a GPS receiver circuit 193 which is configured to receive signals from GPS satellites to determine the precise global position of the communication device 110, 140. The communication device 110, 140 may also include a wired network interface 194, such as a universal serial bus (USB) or FireWire® connector socket, for connecting the processor 191 to an external computing device such as a personal computer or external local area network.

The processor 191 may be any programmable microprocessor, microcomputer or multiple processor chip or chips that can be configured by software instructions (applications) to perform a variety of functions, including the functions of the various embodiments described above. In some communication devices 10, multiple processors 191 may be provided, such as one processor dedicated to wireless communication functions and one processor dedicated to running other applications. Typically, software applications may be stored in the internal memory 192 before they are accessed and loaded into the processor 191. In some communication devices 110, 140, the processor 191 may include internal memory sufficient to store the application software instructions. For the purposes of this description, the term memory refers to all memory accessible by the processor 191, including internal memory 192 and memory within the processor 191 itself. In many communication devices 10, the memory 192 may be a volatile or nonvolatile memory, such as flash memory, or a mixture of both.

Figure 26:
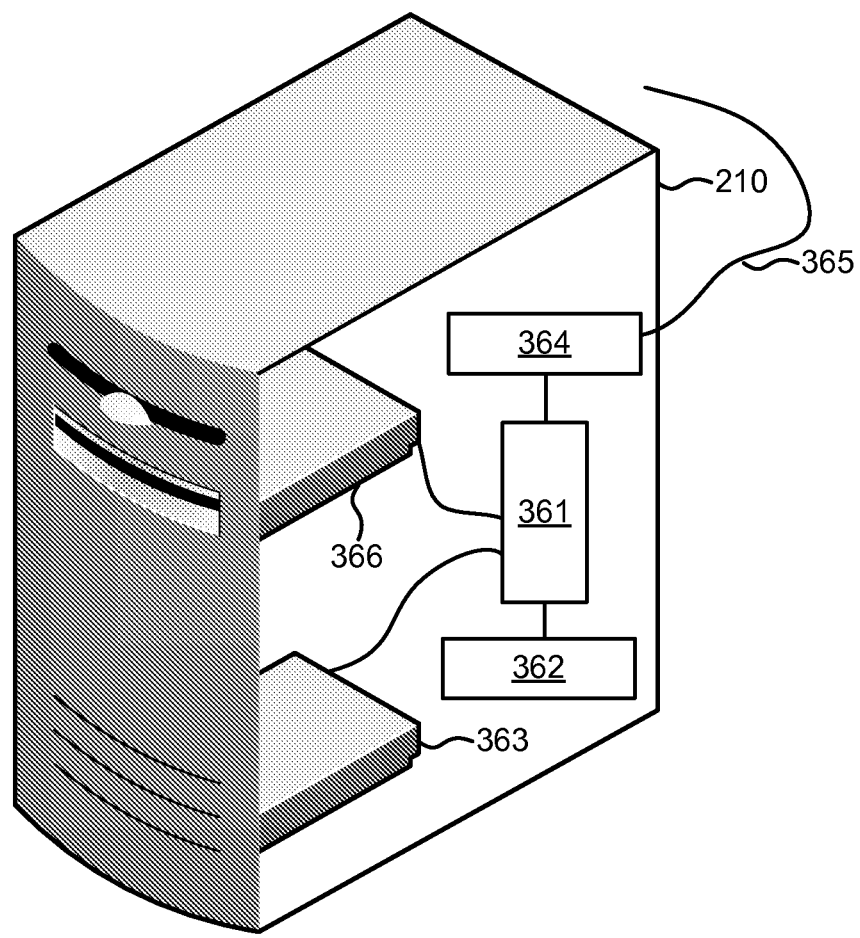
FIG. 26 is a circuit block diagram of an example remote server suitable for use with the various embodiments.

A number of the embodiments described above may also be implemented with any of a variety of remote server devices operating as a SMSC 120, such as the server 210 illustrated in FIG. 26. Such a remote server 210 typically includes a processor 361 coupled to volatile memory 362 and a large capacity nonvolatile memory, such as a disk drive 363. The server 210 may also include a floppy disc drive and/or a compact disc (CD) drive 366 coupled to the processor 361. Typically, the server 210 may also include a user input device like a keyboard (not shown) and a display (not shown). The server 210 may also include a number of connector ports coupled to the processor 361 for establishing data connections or receiving external memory devices, such as USB or FireWire® connector sockets or other network connection circuits 365 for coupling the processor 361 to a network 205.

The various embodiments may be implemented on future enhancements to cellular communication network equipment, such as enhanced SMSC servers that differ from that illustrated in FIG. 26, or entirely different network communication and management equipment. For example, the functionality ascribed to the SMSC 120 in the foregoing embodiment descriptions may be performed on different network equipment or components or distributed across a number of discrete components (e.g., in a "cloud computing" architecture) without departing from the scope of the claims.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing enhanced short messaging service to enable a sender to prevent a recipient from forwarding the received message, comprising:
   receiving a short message service message from a sender's communication device;
   storing the received message in local memory;
   examining the received message to determine if a prevent forwarding flag is set in a header of the message header by the sender;
   receiving a user input request to forward the received message;
   displaying a notice to the recipient indicating the sender's request to prevent forwarding of the received message when the prevent forwarding flag is set; and
   deleting the received message from local memory in response to the request to forward the received message when the prevent forwarding flag is set.

2. A non-transitory storage medium having stored thereon processor-executable software instructions configured to cause a processor to perform operations comprising:
   receiving a short message service message from a sender's communication device via a short message service center;
   storing the received message in local memory;
   examining the received message to determine if a prevent forwarding flag is set in a header of the received message;
   receiving a recipient input request to forward the received message;
   displaying a notice to the recipient indicating the sender's request to prevent forwarding of the received message when the prevent forwarding flag is set; and
   deleting the received message from local memory in response to the request to forward the received message when the prevent forwarding flag is set.

3. A communication device capable of providing enhanced short messaging service to enable a sender to prevent a recipient from forwarding the received message, comprising:
   means for receiving a short message service message from a sender's communication device via a short message service center;
   means for storing the received message in local memory;
   means for examining the received message to determine if a prevent forwarding flag is set in a header of the received message;
   means for receiving a recipient input request to forward the received message;
   means for displaying a notice to the recipient indicating the sender's request to prevent forwarding of the received message when the prevent forwarding flag is set; and
   means for deleting the received message from local memory in response to the request to forward the received message when the prevent forwarding flag is set.

4. A communication device capable of providing enhanced short messaging service to enable a sender to prevent a recipient from forwarding the received message, comprising:
   a local memory; and
   a processor coupled to the local memory, wherein the processor is configured with processor executable instructions to perform operations comprising:
      receiving a short message service message from a sender's communication device via a short message service center;
      storing the received message in the local memory;
      examining the received message to determine if a prevent forwarding flag is set in a header of the received message;
      receiving a recipient input request to forward the received message;
      displaying a notice to the recipient indicating the sender's request to prevent forwarding of the received message when the prevent forwarding flag is set; and
      deleting the received message from the local memory in response to the request to forward the received message when the prevent forwarding flag is set.

* * * * *